United States Patent
Khoshnevisan et al.

(10) Patent No.: US 12,108,351 B2
(45) Date of Patent: Oct. 1, 2024

(54) RESOURCE ELEMENT OVERLAP BETWEEN A SYNCHRONIZATION SIGNAL BLOCK AND DEMODULATION REFERENCE SIGNAL

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/740,881

(22) Filed: May 10, 2022

(65) Prior Publication Data
US 2022/0369250 A1    Nov. 17, 2022

Related U.S. Application Data

(60) Provisional application No. 63/187,293, filed on May 11, 2021.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 72/02* (2013.01); *H04W 72/23* (2023.01)

(58) Field of Classification Search
CPC ... H04W 56/001; H04W 72/02; H04W 72/04; H04W 72/044; H04W 72/0446;
(Continued)

(56) References Cited

U.S. PATENT DOCUMENTS

| 11,412,400 B2 * | 8/2022 | Ratasuk | ................ G01S 5/0036 |
| 11,647,410 B2 * | 5/2023 | Zhu | ........................ H04L 5/0078 |
| | | | 370/252 |

(Continued)

FOREIGN PATENT DOCUMENTS

| CA | 3047410 A1 * | 7/2018 | ........... H04L 5/0007 |
| CA | 3075492 A1 * | 4/2019 | ........... H04L 1/1812 |

(Continued)

OTHER PUBLICATIONS

HUAWEI., et al., "Discussion on Conditions of Rate Matching Pattern Overlapping With PDSCH DMRS Symbols", 3GPP TSG RAN WG1 Meeting #98bis, R1-1910417, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, XP051808563, 6 Pages.

(Continued)

*Primary Examiner* — Kevin D Mew
(74) *Attorney, Agent, or Firm* — Kevin M. Donnelly; Holland & Hart LLP

(57) ABSTRACT

Methods, systems, and devices for wireless communications are described. A user equipment (UE) may receive a synchronization signal block (SSB) including a physical layer cell identifier (PCI), where one or more resource elements carrying the SSB overlap with resource elements carrying a downlink shared channel associated with another PCI. The PCIs may be for a serving cell or another cell, such as a non-serving cell. The UE may also receive one or more demodulation reference signals (DMRSs) in the one or more resource elements in the downlink shared channel. The UE may determine whether overlap is permitted between the resource elements by comparing the PCIs of the SSB and the downlink shared channel. In some examples, once the UE determines whether resource element overlap is permitted, the UE may process the DMRSs.

30 Claims, 19 Drawing Sheets

(51) Int. Cl.
*H04W 72/02* (2009.01)
*H04W 72/23* (2023.01)

(58) Field of Classification Search
CPC ............ H04W 72/0453; H04W 72/23; H04W 72/046; H04L 5/0048; H04L 5/0051
See application file for complete search history.

(56) References Cited

U.S. PATENT DOCUMENTS

| | | | |
|---|---|---|---|
| 2018/0323850 A1* | 11/2018 | Baligh | H04B 7/024 |
| 2018/0324678 A1* | 11/2018 | Chen | H04W 8/08 |
| 2020/0322890 A1* | 10/2020 | Menon | H04W 24/10 |
| 2021/0067301 A1* | 3/2021 | Luo | H04L 5/0053 |
| 2022/0167276 A1* | 5/2022 | Kumar | H04W 52/146 |

FOREIGN PATENT DOCUMENTS

| | | | | |
|---|---|---|---|---|
| CA | 3088810 A1 * | 7/2019 | ............ | H04W 36/00 |
| WO | WO-2018204703 A1 * | 11/2018 | ............ | H04W 24/10 |
| WO | WO-2019040352 A1 * | 2/2019 | ............ | H04L 5/0048 |
| WO | WO-2020216130 A1 | 10/2020 | | |

OTHER PUBLICATIONS

International Search Report and Written Opinion—PCT/US2022/028762—ISA/EPO—Jul. 29, 2022.

* cited by examiner

RESOURCE ELEMENT OVERLAP BETWEEN A SYNCHRONIZATION SIGNAL BLOCK AND DEMODULATION REFERENCE SIGNAL

CROSS REFERENCE

The present Application for Patent claims the benefit of U.S. Provisional Patent Application No. 63/187,293 by KHOSHNEVISAN et al., entitled "RESOURCE ELEMENT OVERLAP BETWEEN A SYNCHRONIZATION SIGNAL BLOCK AND DEMODULATION REFERENCE SIGNAL," filed May 11, 2022, assigned to the assignee hereof, and expressly incorporated by reference herein.

FIELD OF TECHNOLOGY

The following relates to wireless communications, including resource element overlap between a synchronization signal block (SSB) and demodulation reference signal (DMRS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support resource element overlap between synchronization signal block and demodulation reference signal. Generally, the described techniques provide for a user equipment (UE) to determine whether overlap is permitted between resource elements carrying a synchronization signal block (SSB) and resource elements carrying a demodulation reference signal (DMRS) in a downlink shared channel. The UE may receive an SSB including a physical layer cell identifier (PCI), where one or more resource elements carrying the SSB overlap with resource elements carrying the downlink shared channel associated with another PCI. The PCIs may be for a serving cell or another cell, such as a non-serving cell. The UE may also receive one or more DMRSs in the one or more resource elements in the downlink shared channel. The UE may determine whether overlap is permitted between the resource elements by comparing the PCIs of the SSB and the downlink shared channel. In some examples, once the UE determines whether resource element overlap is permitted, the UE may process the DMRSs.

A method for wireless communications at a UE is described. The method may include receiving an SSB associated with a first PCI, where one or more resource elements carrying the SSB overlap with one or more resource elements carrying a downlink shared channel associated with a second PCI, determining, according to a comparison of the first PCI and the second PCI, whether overlap is permitted between the one or more resource elements carrying the SSB and one or more resource elements carrying a DMRS corresponding to the downlink shared channel, and processing the DMRS based on the determination.

An apparatus for wireless communications at a UE is described. The apparatus may include a processor, memory coupled with the processor, and instructions stored in the memory. The instructions may be executable by the processor to cause the apparatus to receive an SSB associated with a first PCI, where one or more resource elements carrying the SSB overlap with one or more resource elements carrying a downlink shared channel associated with a second PCI, determine, according to a comparison of the first PCI and the second PCI, whether overlap is permitted between the one or more resource elements carrying the SSB and one or more resource elements carrying a DMRS corresponding to the downlink shared channel, and process the DMRS based on the determination.

Another apparatus for wireless communications at a UE is described. The apparatus may include means for receiving an SSB associated with a first PCI, where one or more resource elements carrying the SSB overlap with one or more resource elements carrying a downlink shared channel associated with a second PCI, means for determining, according to a comparison of the first PCI and the second PCI, whether overlap is permitted between the one or more resource elements carrying the SSB and one or more resource elements carrying a DMRS corresponding to the downlink shared channel, and means for processing the DMRS based on the determination.

A non-transitory computer-readable medium storing code for wireless communications at a UE is described. The code may include instructions executable by a processor to receive an SSB associated with a first PCI, where one or more resource elements carrying the SSB overlap with one or more resource elements carrying a downlink shared channel associated with a second PCI, determine, according to a comparison of the first PCI and the second PCI, whether overlap is permitted between the one or more resource elements carrying the SSB and one or more resource elements carrying a DMRS corresponding to the downlink shared channel, and process the DMRS based on the determination.

In some examples of the method, apparatuses, and non-transitory computer-readable medium described herein, determining whether overlap may be permitted may include operations, features, means, or instructions for determining that no overlap may be permitted between the one or more resource elements carrying the SSB and the one or more resource elements carrying the DMRS based on the first PCI and the second PCI corresponding to a serving cell.

In some examples of the method, apparatuses, and non-transitory computer-readable medium described herein, determining whether overlap may be permitted may include operations, features, means, or instructions for determining that no overlap may be permitted between the one or more resource elements carrying the SSB and the one or more resource elements carrying the DMRS based on the first PCI and the second PCI being a same PCI.

In some examples of the method, apparatuses, and non-transitory computer-readable medium described herein, determining whether overlap may be permitted may include operations, features, means, or instructions for determining that no overlap may be permitted between the one or more resource elements carrying the SSB and the one or more resource elements carrying the DMRS based on the first PCI and the second PCI corresponding to a second cell.

In some examples of the method, apparatuses, and non-transitory computer-readable medium described herein, determining whether overlap may be permitted may include operations, features, means, or instructions for determining that overlap may be permitted between the one or more resource elements carrying the SSB and the one or more resource elements carrying the DMRS based on the first PCI corresponding to a serving cell and the second PCI corresponding to a second cell.

In some examples of the method, apparatuses, and non-transitory computer-readable medium described herein, determining whether overlap may be permitted may include operations, features, means, or instructions for determining that overlap may be permitted between the one or more resource elements carrying the SSB and the one or more resource elements carrying the DMRS based on the first PCI corresponding to a second cell and the second PCI corresponding to a serving cell.

Some examples of the method, apparatuses, and non-transitory computer-readable medium described herein may further include operations, features, means, or instructions for receiving a control message corresponding to a control resource set (CORESET) pool index value corresponding to the downlink shared channel, the control message including a scheduling downlink control information (DCI) message.

Some examples of the method, apparatuses, and non-transitory computer-readable medium described herein may further include operations, features, means, or instructions for determining the downlink shared channel may be associated with a serving cell based on the CORESET pool index value having a value of zero.

Some examples of the method, apparatuses, and non-transitory computer-readable medium described herein may further include operations, features, means, or instructions for determining the downlink shared channel may be associated with a second cell based on the CORESET pool index value having a value of one.

In some examples of the method, apparatuses, and non-transitory computer-readable medium described herein, the control message may be a semi-persistent scheduling (SPS) control message corresponding to an activating DCI message received in a CORESET associated with the CORESET pool index value.

In some examples of the method, apparatuses, and non-transitory computer-readable medium described herein, the control message may be an SPS control message corresponding to SPS configuration in a radio resource control (RRC) message, the SPS configuration indicating the CORESET pool index value.

Some examples of the method, apparatuses, and non-transitory computer-readable medium described herein may further include operations, features, means, or instructions for determining the downlink shared channel may be associated with a serving cell based on a quasi-colocation (QCL) relationship corresponding to the SSB being associated with the serving cell.

Some examples of the method, apparatuses, and non-transitory computer-readable medium described herein may further include operations, features, means, or instructions for determining the downlink shared channel may be associated with a second cell based on a QCL relationship corresponding to the SSB being associated with the second cell.

A method for wireless communications at a network entity is described. The method may include transmitting an SSB associated with a first PCI, where one or more resource elements carrying the SSB overlap with one or more resource elements carrying a downlink shared channel associated with a second PCI, determining, according to a comparison of the first PCI and the second PCI, whether overlap is permitted between the one or more resource elements carrying the SSB and one or more resource elements carrying a DMRS corresponding to the downlink shared channel, and processing the DMRS based on the determination.

An apparatus for wireless communications at a network entity is described. The apparatus may include a processor, memory coupled with the processor, and instructions stored in the memory. The instructions may be executable by the processor to cause the apparatus to transmit an SSB associated with a first PCI, where one or more resource elements carrying the SSB overlap with one or more resource elements carrying a downlink shared channel associated with a second PCI, determine, according to a comparison of the first PCI and the second PCI, whether overlap is permitted between the one or more resource elements carrying the SSB and one or more resource elements carrying a DMRS corresponding to the downlink shared channel, and process the DMRS based on the determination.

Another apparatus for wireless communications at a network entity is described. The apparatus may include means for transmitting an SSB associated with a first PCI, where one or more resource elements carrying the SSB overlap with one or more resource elements carrying a downlink shared channel associated with a second PCI, means for determining, according to a comparison of the first PCI and the second PCI, whether overlap is permitted between the one or more resource elements carrying the SSB and one or more resource elements carrying a DMRS corresponding to the downlink shared channel, and means for processing the DMRS based on the determination.

A non-transitory computer-readable medium storing code for wireless communications at a network entity is described. The code may include instructions executable by a processor to transmit an SSB associated with a first PCI, where one or more resource elements carrying the SSB overlap with one or more resource elements carrying a downlink shared channel associated with a second PCI, determine, according to a comparison of the first PCI and the second PCI, whether overlap is permitted between the one or more resource elements carrying the SSB and one or more resource elements carrying a DMRS corresponding to the downlink shared channel, and process the DMRS based on the determination.

Some examples of the method, apparatuses, and non-transitory computer-readable medium described herein may further include operations, features, means, or instructions for determining there may be no overlap between the one or more resource elements carrying the SSB and the one or more resource elements carrying the DMRS based on the first PCI and the second PCI corresponding to a serving cell.

Some examples of the method, apparatuses, and non-transitory computer-readable medium described herein may further include operations, features, means, or instructions for determining there may be no overlap between the one or more resource elements carrying the SSB and the one or more resource elements carrying the DMRS based on the first PCI and the second PCI being a same PCI.

Some examples of the method, apparatuses, and non-transitory computer-readable medium described herein may further include operations, features, means, or instructions for determining there may be no overlap between the one or more resource elements carrying the SSB and the one or more resource elements carrying the DMRS based on the first PCI and the second PCI corresponding to a second cell.

Some examples of the method, apparatuses, and non-transitory computer-readable medium described herein may further include operations, features, means, or instructions for determining the one or more resource elements carrying the SSB and the one or more resource elements carrying the DMRS overlap based on the first PCI corresponding to a serving cell and the second PCI corresponding to a second cell.

Some examples of the method, apparatuses, and non-transitory computer-readable medium described herein may further include operations, features, means, or instructions for determining the one or more resource elements carrying the SSB and the one or more resource elements carrying the DMRS overlap based on the first PCI corresponding to a second cell and the second PCI corresponding to a serving cell.

Some examples of the method, apparatuses, and non-transitory computer-readable medium described herein may further include operations, features, means, or instructions for transmitting a control message indicating a CORESET pool index value corresponding to the downlink shared channel.

Some examples of the method, apparatuses, and non-transitory computer-readable medium described herein may further include operations, features, means, or instructions for determining the downlink shared channel may be associated with a serving cell based on the CORESET pool index value having a value of zero.

Some examples of the method, apparatuses, and non-transitory computer-readable medium described herein may further include operations, features, means, or instructions for determining the downlink shared channel may be associated with a second cell based on the CORESET pool index value having a value of one.

In some examples of the method, apparatuses, and non-transitory computer-readable medium described herein, the control message may be an SPS control message corresponding to an activating DCI message received in a CORESET associated with the CORESET pool index value.

In some examples of the method, apparatuses, and non-transitory computer-readable medium described herein, the control message may be an SPS control message corresponding to SPS configuration in an RRC message, the SPS configuration indicating the CORESET pool index value.

Some examples of the method, apparatuses, and non-transitory computer-readable medium described herein may further include operations, features, means, or instructions for determining the downlink shared channel may be associated with a serving cell based on a QCL relationship corresponding to the SSB being associated with the serving cell.

Some examples of the method, apparatuses, and non-transitory computer-readable medium described herein may further include operations, features, means, or instructions for determining the downlink shared channel may be associated with a second cell based on a QCL relationship corresponding to the SSB being associated with the second cell.

DETAILED DESCRIPTION

Figure 1:
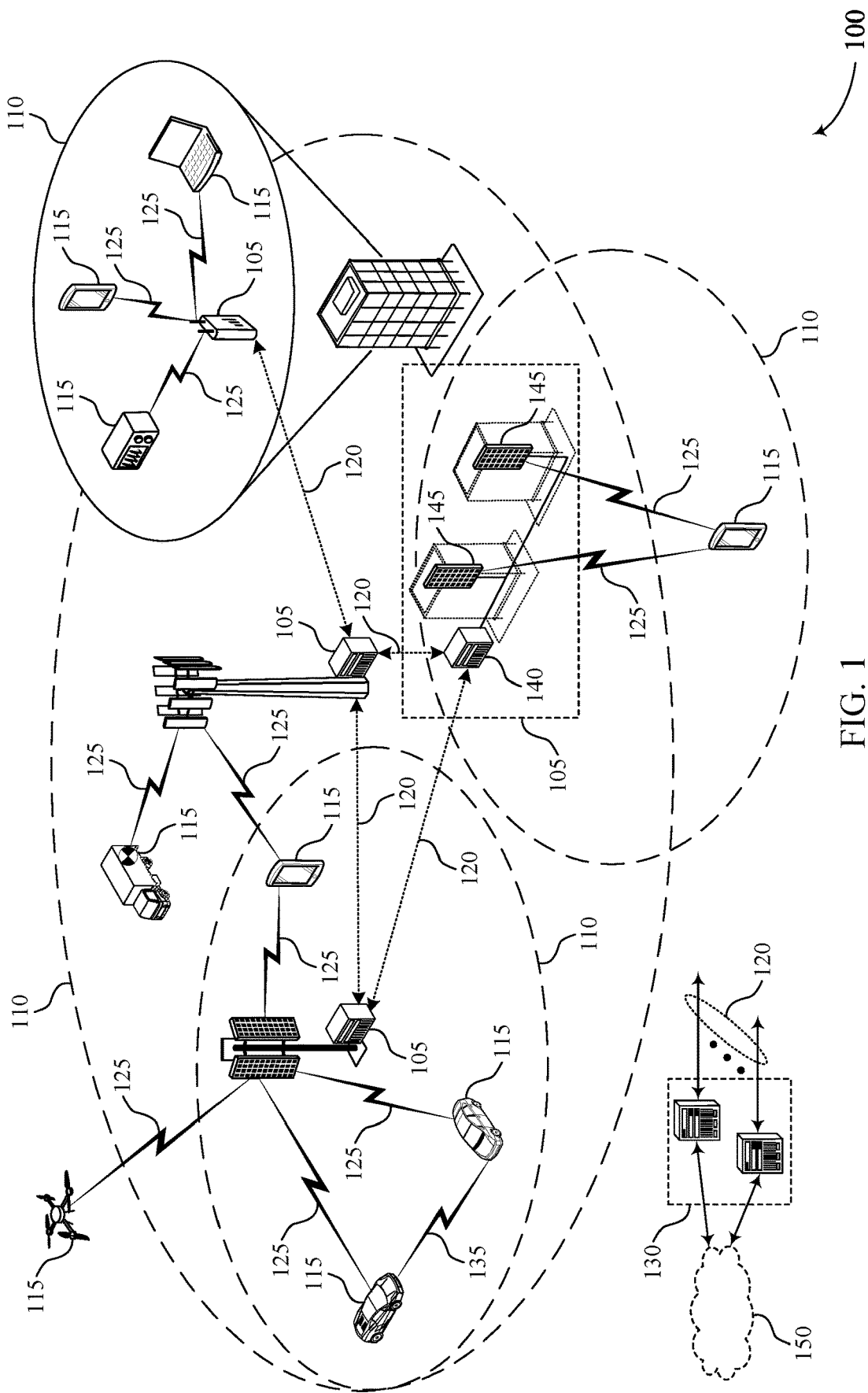
FIGS. 1 and 2 illustrate examples of wireless communications systems that support resource element overlap between a synchronization signal block (SSB) and demodulation reference signal (DMRS) in accordance with aspects of the present disclosure.

In some communications systems, prior to exchanging data and additional messages, a user equipment (UE) may monitor for and receive synchronization signals from a cell or a network entity, such as one or more components of a base station, to determine configuration and timing information for transmitting and receiving subsequent messages with the cell or base station. For example, the cell or one or more components of the base station may transmit a synchronization signal block (SSB) that includes a primary synchronization signal (PSS), a secondary synchronization signal (SSS), a physical broadcast channel (PBCH), a master information block (MIB), etc. In some examples, the SSB may also include a physical layer cell identifier (PCI) to indicate for which type of cell the SSB is configured. For example, the SSB may include or may be associated with a serving cell PCI (e.g., where the PCI is determined from a PSS and SSS) or a non-serving cell PCI (e.g., one or more additional PCIs configured via radio resource control (RRC) signaling), where the UE uses respective synchronization information for communications with a corresponding serving cell or non-serving cell based on the PCI. Additionally, in some cases, the SSB may overlap in time with one or more downlink channels transmitted by a same or different cell than the cell that transmits the SSB. Techniques are desired for determining whether information for the SSB can be used to receive a downlink channel, including one or more demodulation reference signals (DMRSs), of the one or more downlink channels that overlap in time with the SSB.

A UE may determine when to expect a resource element overlap between an SSB and a DMRS of a downlink shared channel (e.g., a physical downlink shared channel (PDSCH)) based on an association of the SSB and the downlink shared channel with a PCI. For example, if the SSB and the PDSCH are both associated with serving cell PCIs, the UE may not expect overlap between the resource elements. Similarly, if the SSB and PDSCH are both associated with non-serving cell PCIs, the UE may not expect overlap between the resource elements. However, if one of the SSB or the PDSCH is associated with a serving cell, and the other is associated with a non-serving cell, the UE may expect overlap between the resource elements. Thus, the UE may receive an SSB from a cell or base station including a PCI and may determine an overlap between the resource elements carrying the SSB and the resource elements in a PDSCH carrying a DMRS based on whether the PCI of the SSB and PCI of the PDSCH are associated with serving cells or non-serving cells. The UE may receive the DMRS based on the determining the resource elements of the SSB and DMRS overlap or do not overlap. In some examples, the UE may determine the PDSCH is associated with a serving cell or non-serving cell based on a control resource set (CORESET) pool index, which the UE may receive an indication of in control signaling from a cell or base station. Additionally or alternatively, the UE may determine the PDSCH is associated with a serving cell or non-serving cell based on a quasi-colocation (QCL) relationship with the SSB.

Aspects of the disclosure are initially described in the context of wireless communications systems. Aspects of the disclosure are further described in the context of a resource diagram, a transmission diagram, and a process flow. Aspects of the disclosure are further illustrated by and described with reference to apparatus diagrams, system diagrams, and flowcharts that relate to resource element overlap between an SSB and DMRS.

FIG. 1 illustrates an example of a wireless communications system 100 that supports resource element overlap between an SSB and DMRS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include components that are located at a single physical location or components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 or a base station 105 including components that are located at various physical locations. In some implementations, such a base station 105 including components that are located at various physical locations may be referred to as or may be associated with a disaggregated radio access network (RAN) architecture, such as an Open RAN (O-RAN) or Virtualized RAN (VRAN) architecture.

As used herein, the term "network entity" may refer to a standalone base station, a component of a base station (such as one of components that are physically or logically separated to collectively implement the functionality of a base station), or another network device that communicates with, or supports communication with a UE 115.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may monitor for and receive synchronization signals from a cell or base station 105. The UE 115 may use the synchronization signals to determine configuration and timing information for transmitting and receiving subsequent messages with the cell or base station 105. In some examples, a base station 105 or a cell may transmit an SSB to a UE 115 including one or more synchronization signals, which the UE 115 may use to determine configuration and timing information for subsequent messages. In some cases, a serving cell (e.g., a cell serving the UE 115) may have a PCI determined from the synchronization signals in an initial access procedure. A non-serving cell, or alternative cell (e.g., other than a serving cell), may have one or more additional PCIs configured by control signaling. In some cases, such as if downlink shared channel (e.g., a PDSCH) resources overlap with SSB resources in time, frequency, or both, the downlink shared channel may be rate matched around one or more PRBs including the SSB. The UE 115 may not expect resource elements of a DMRS of the downlink shared channel to overlap with resource elements for the SSB. However, there may be interference between the SSB and the downlink shared channel if downlink shared channels associated with a serving cell PCI are not rate matched around one or more non-serving cell SSBs or if downlink shared channels associated with a non-serving cell PCI are not rate matched around one or more serving cell SSBs.

In some cases, a UE 115 may determine whether overlap is permitted between resource elements carrying an SSB and resource elements carrying a DMRS in a downlink shared channel (e.g., a PDSCH). For example, the UE 115 may receive an SSB from a base station including a PCI for a serving cell or another cell in one or more resource elements. The UE 115 may also receive one or more DMRSs from the base station 105 in one or more resource elements in a PDSCH. The PDSCH may be associated with a cell, such as the serving cell or the other cell. For example, the PDSCH may have a PCI for the same cell as the PCI of the SSB (e.g., a same PCI) or for a different cell than the PCI of the SSB. The UE 115 may compare the PCIs of the SSB and the PDSCH to determine whether there is overlap in resource elements. In some cases, the conditions of whether the UE 115 may expect overlap of resource elements between the SSB and the DMRS of the PDSCH may be based on the association of the SSB and the PDSCH with the PCIs, which is described in further detail with respect to FIG. 3. In some examples, once the UE 115 determines whether resource element overlap is permitted, the UE 115 may process the DMRSs.

Figure 2:
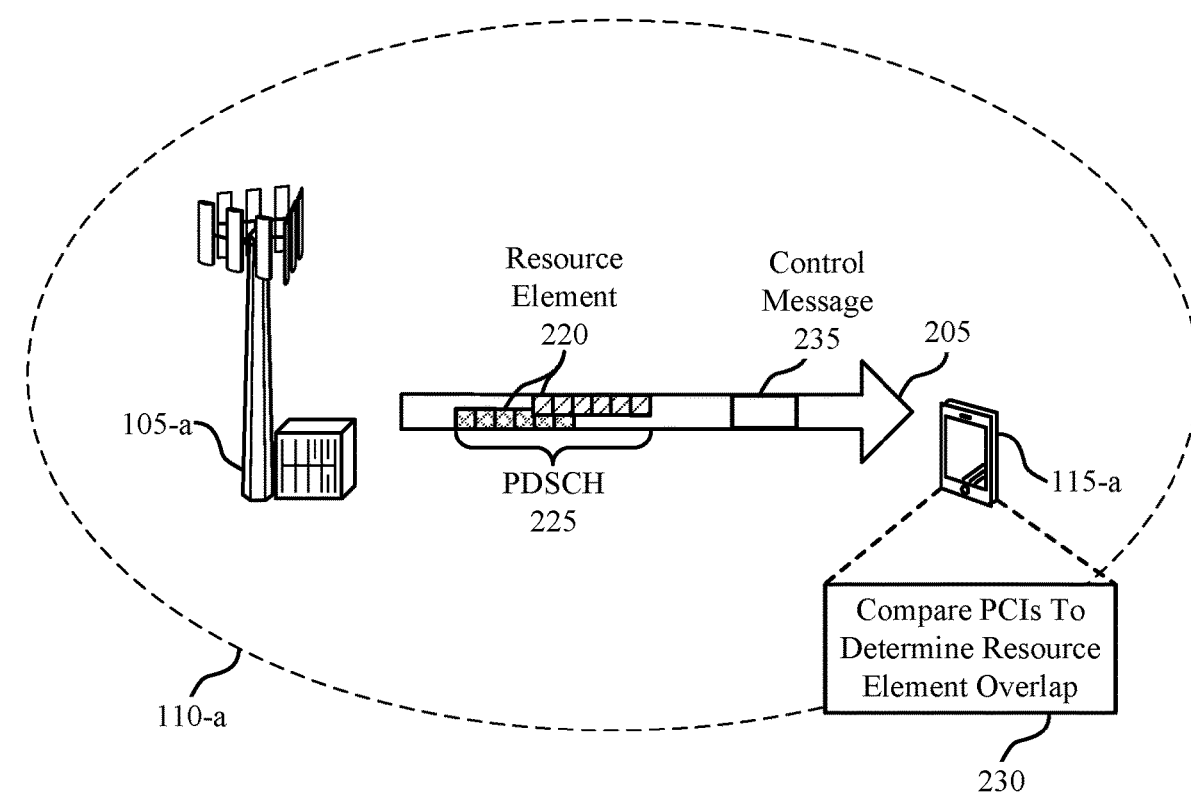

FIG. 2 illustrates an example of a wireless communications system 200 that supports resource element overlap between an SSB and DMRS in accordance with aspects of the present disclosure. In some examples, wireless communications system 200 may implement aspects of wireless communications system 100 and may include a UE 115-a and a base station 105-a with a coverage area 110-a, which may be examples of a UE 115 and a base station 105 with a coverage area 110 as described with reference to FIG. 1. In some examples, base station 105-a and UE 115-a may communicate control information, data, or both using a downlink communication link 205 and an uplink communication link. For example, base station 105-a may transmit an SSB 210 and a DMRS 215 to UE 115-a using one or more resource elements 220, which may or may not overlap.

In some examples, a UE 115 may monitor for and receive synchronization signals from a cell or base station 105. The UE 115 may use the synchronization signals to determine configuration and timing information for transmitting and receiving subsequent messages with the cell or base station 105. In some examples, the base station 105 may transmit an SSB 210 (e.g., over 4 OFDM symbols) including the synchronization signals, such as a PSS, an SSS, a PBCH, an MIB, or a combination thereof. In some cases, the base station 105 may transmit the synchronization signals in a synchronization signal burst set, which may be a set of SSBs 210 within a beam-sweep (e.g., during a 5 millisecond (ms) time interval in a first or second half of a frame). The periodicity of the synchronization signal burst set may vary (e.g., 5 ms, 10 ms, 20 ms, . . . 160 ms with a default periodicity of 20 ms). In some examples, there may be a maximum number of SSBs 210 within a synchronization signal burst set (e.g., 4 for sub-3 GHz, 8 for sub-7 GHz, 64 for Frequency Range 2 (FR2)).

In some cases, the base station 105 or cells may transmit the SSBs 210 with different beams. The beams may be indexed with an SSB index (e.g., 0, 1 . . . 63 for 64 SSBs). The time domain location, such as a slot or one or more OFDM symbols, of each SSB may be from a set of patterns (e.g., a defined or fixed set of patterns). The patterns may depend on subcarrier spacing (e.g., 15 or 30 kilohertz (kHz) for Frequency Range 1 (FR1) and 120 or 240 kHz for FR2). The base station 105 may indicate a location of the SSBs 210 to the UE 115. For example, the base station 105 may transmit one or more SSB indices that the base station 105 transmits as a parameter in control signaling (e.g., ssb-PositionsInBurst in a system information block (SIB), such as SIB Type 1 (SIB1), or in ServingCellConfigCommon).

In some cases, a UE 115, such as UE 115-a, may communicate with one or more base stations 105, one or more cells, one or more transmission reception points (TRPs), or a combination thereof. In some examples, a transmission configuration indicator (TCI) state for a cell or TRP may be defined according to QCL information that configures a reference signal. In some other examples, each cell may have a defined PCI and SSB set. For example, a serving cell (e.g., a cell serving UE 115-a) may have a PCI determined from the PSS and SSS in an initial access procedure. A non-serving cell, or alternative cell (e.g., other than a serving cell), may have one or more additional PCIs configured by control signaling. In some cases, base station 105-a may configure one or more cells with PCIs via RRC signaling. The base station 105 may configure an SSB set for the UE 115 associated with the RRC configured PCI (e.g., a PCI for a non-serving cell). If there are multiple PCIs for non-serving cells, the base station 105 may configure multiple SSB sets.

In some cases, the non-serving PCI or SSB 210 may define a TCI state or QCL information based on an SSB index from the set of SSBs 210 associated with a neighbor PCI (e.g., neighboring cell). The TCI state (e.g., a PDSCH TCI state, a PDCCH TCI state, or both) associated with a different PCI may be indirectly QCLed with an SSB 210 associated with that PCI. For example, in a multi-TRP transmission scenario, a secondary TRP may have a different PCI (e.g., inter-cell multi-TRP). In some other examples, such as for a multi-TRP transmission scenario with multiple control messages (e.g., downlink control information (DCI) messages), the base station 105 may configure multiple CORESET pool index values for different CORESETs.

In some cases, such as for inter-cell multi-TRP operation, a UE 115 and a base station 105 may support an additional PCI that may be different from the serving cell PCI per component carrier. The additional PCI may be associated with one or more activated TCI states for a reference signal (e.g., CSI-RS for CSI), a downlink shared channel, a downlink control channel, or a combination thereof per component carrier, such as for scenarios with a non-cross carrier QCL indication. In some examples, the base station 105 and UE 115 may determine non-serving cell SSB information. For example, the information may include an SSB time domain position, SSB transmission periodicity, SSB transmission power, other non-serving cell information, or the like (e.g., according to an implicit or explicit indication).

In some cases, such as if downlink shared channel (e.g., a PDSCH 225) resources overlap with SSB resources in time, frequency, or both, the downlink shared channel may be rate matched around one or more PRBs including the SSB 210. That is, the PRBs may not be available for the downlink shared channel. One or more SSBs 210 may be considered for rate matching according to one or more parameters, such as an ssb-PositionsInBurst (e.g., one or more of 64 SSBs 210). The UE 115 may not expect resource elements of a DMRS 215 of the downlink shared channel to overlap with resource elements for the SSB 210 (e.g., rate matching may be for data tones). In some examples, such as for an inter-cell multi-TRP transmission scenario, one or more downlink shared channels associated with a serving cell PCI may not be rate matched around serving cell SSBs 210. In some other examples, one or more downlink shared channels associated with other, non-serving, cell PCIs may be rate matched around non-serving cell SSBs 210. However, there may be interference between the SSB 210 and the downlink shared channel if downlink shared channels associated with a serving cell PCI are not rate matched around one or more non-serving cell SSBs 210 or if downlink shared channels associated with a non-serving cell PCI are not rate matched around one or more serving cell SSBs 210.

In some examples, such as when the base station 105 performs rate matching, the resource elements may not overlap with a DMRS 215. For example, the rate matching may be applicable for data tones (e.g., data tones excluding DMRS tones may be rate matched around, but there may not be overlap with DMRS tones). In some other examples, such as when the base station 105 does not perform rate matching, then there may be interference on data tones (e.g., from an SSB 210 of another TRP). Thus, it may be acceptable for the DMRS tones to experience similar interference (e.g., overlap may be permitted since there may be interference on data tones on the overlapping PRBs). The base station 105 may benefit from taking the conditions for no resource element overlap with DMRS 215 into account. For example, the base station 105 may account for whether the overlapping downlink shared channel is associated with serving cell or another, non-serving, cell. Additionally or alternatively, the base station 105 may account for whether an overlapping SSB 210 is associated with a serving cell or the other, non-serving, cell.

In some cases, a UE 115 may determine whether overlap is permitted between resource elements 220 carrying an SSB 210 and resource elements 220 carrying a DMRS 215 in a downlink shared channel (e.g., a PDSCH 225). For example, UE 115-a may receive an SSB 210 in one or more resource elements 220 from base station 105-a via downlink communication link 205. The SSB may include a PCI for a serving cell or another cell, which may be a non-serving cell. UE 115-a may also receive one or more DMRSs 215 from base station 105-a in one or more resource elements 220 in a PDSCH 225. The PDSCH 225 may be associated with a cell, such as the serving cell or the other cell. For example, the PDSCH 225 may have a PCI for the same cell as the PCI of the SSB 210 (e.g., a same PCI) or for a different cell than the PCI of the SSB. At 230, UE 115-a may compare the PCIs of the SSB 210 and the PDSCH 225 to determine whether there is overlap in resource elements 220. In some cases, the conditions of whether UE 115-a may expect overlap of resource elements 220 between the SSB 210 and the DMRS 215 of the PDSCH 225 may be based on the association of the SSB 210 and the PDSCH 225 with the PCIs, which is described in further detail with respect to FIG. 3.

In some examples, UE 115-a may determine whether the PDSCH 225 is associated with a serving cell PCI or another PCI, such as a non-serving cell PCI, based on a control message 235. For example, UE 115-a may receive the control message 235 from base station 105-a via downlink communication link 205. UE 115-a may identify a CORESET pool index value for the PDSCH 225 based on the control message 235. In some cases, the control message 235 may dynamically schedule the PDSCH 225 (e.g., via a DCI message). UE 115-a may identify the CORESET pool index value based on the CORESET pool index value of the CORESET in which UE 115-a receives the scheduling DCI. In some other cases, the control message 235 may semi-persistently schedule (SPS) the PDSCH 225. UE 115-a may identify the CORESET pool index value based on the CORESET pool index value of the CORESET in which UE 115-a receives an activating DCI. Additionally or alternatively, UE 115-a may identify the CORESET pool index value based on the CORESET pool index value for an SPS configuration. Base station 105-a may RRC configure the SPS configuration with a CORESET Pool Index value of 0 or 1. In some cases, if the CORESET pool index value is 0, the PDSCH 225 may be associated with a serving cell. In some other cases, if the CORESET pool index value is 1, the PDSCH 225 may be associated with another cell, such as a non-serving cell.

Figure 4:
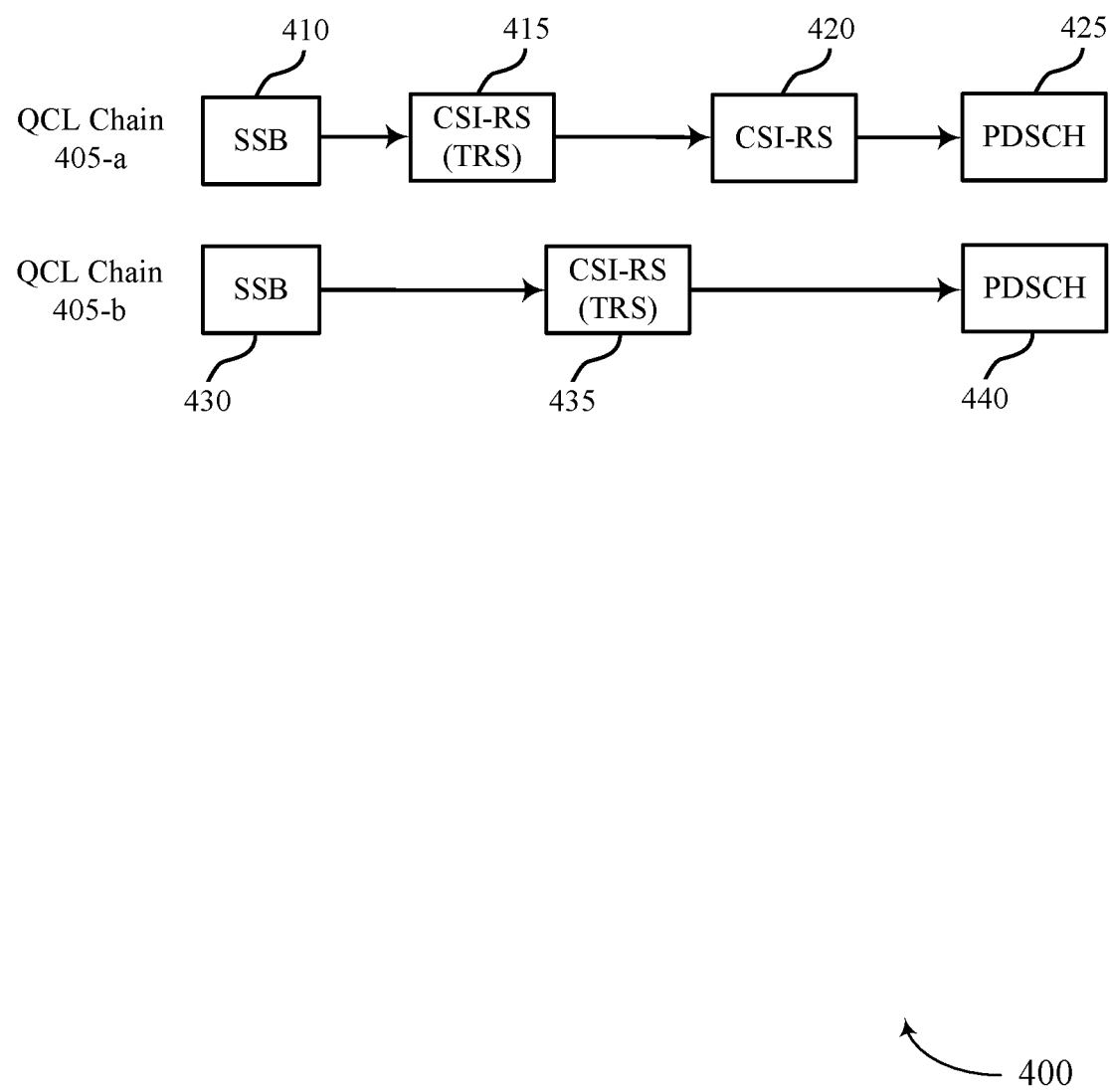
FIG. 4 illustrates an example of a transmission diagram that supports resource element overlap between an SSB and DMRS in accordance with aspects of the present disclosure.

In some other examples, UE 115-a may determine whether the PDSCH 225 is associated with a serving cell PCI or another PCI, such as a non-serving cell PCI, based on an indirect QCL relationship, such as a top QCL chain, which is described in further detail with respect to FIG. 4. In some examples, once UE 115-*a* determines whether resource element overlap is permitted, UE 115-*a* may process the DMRSs 215.

Figure 3:
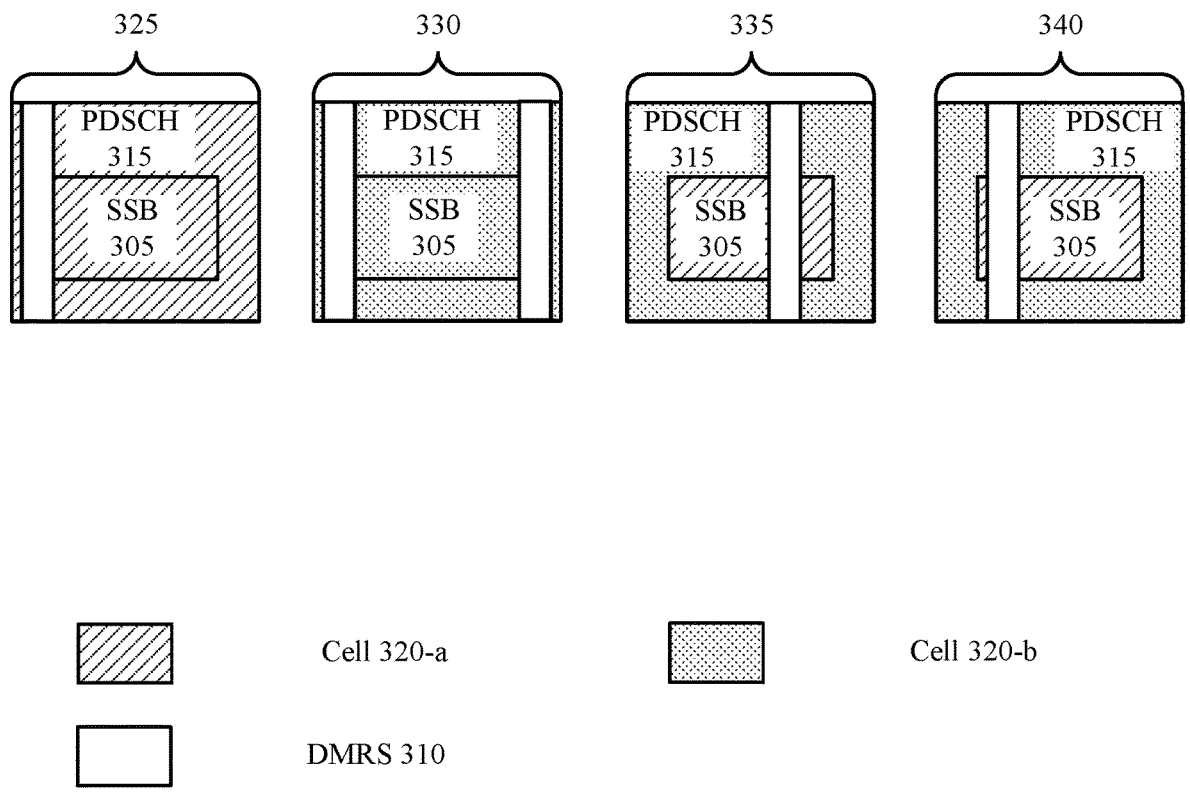
FIG. 3 illustrates an example of a resource diagram that supports resource element overlap between an SSB and DMRS in accordance with aspects of the present disclosure.

FIG. 3 illustrates an example of a resource diagram 300 that supports resource element overlap between an SSB and DMRS in accordance with aspects of the present disclosure. In some examples, resource diagram 300 may implement aspects of wireless communications system 100 and wireless communications system 200. For example, resource diagram 300 may be implemented by a UE 115 and a base station 105 as described with reference to FIGS. 1 and 2. In some cases, a base station may transmit an SSB 305 and a DMRS 310 in a downlink shared channel to a UE. The resource elements of the SSB 305 and the DMRS 310 may overlap according to whether resource element overlap is permitted or not at the UE.

In some examples, a UE may determine whether to expect resource element overlap between an SSB 305 and a DMRS 310 of a downlink shared channel (e.g., a PDSCH 315). For example, the SSB 305 may be associated with a PCI for cell 320-*a*, which may be a serving cell PCI, or a PCI for another cell 320-*b*, such as a non-serving cell PCI. Similarly, the PDSCH 315 that includes the DMRS 310 may be associated with the PCI for cell 320-*a* or the PCI for cell 320-*b*. The UE may expect the resource element overlap based on the associations of the SSB 305 with the serving cell PCI or non-serving cell PCI and the association of the PDSCH 315 with the serving cell PCI or the non-serving cell PCI.

In some examples, at 325, there may be resource element overlap between an SSB 305 associated with a PCI for cell 320-*a*, such as a serving cell PCI, and a PDSCH 315 associated with the PCI for cell 320-*a*. The UE may not expect overlap between the resource elements for a DMRS 310 of the PDSCH 315 and resource elements of the SSB 305.

In some other examples, at 330, there may be resource element overlap between an SSB 305 associated with a PCI for cell 320-*b*, such as a non-serving cell PCI, and a PDSCH 315 associated with the PCI for cell 320-*b*. The UE may not expect overlap between the resource elements for a DMRS 310 of the PDSCH 315 and resource elements of the SSB 305.

In some other examples, at 335, there may be resource element overlap between an SSB 305 associated with a PCI for cell 320-*a*, such as a serving cell PCI, and a PDSCH 315 associated with a PCI for cell 320-*b*, which may be a non-serving cell PCI. The UE may expect overlap between the resource elements for a DMRS 310 of the PDSCH 315 and resource elements of the SSB 305.

In some other examples, at 340, there may be resource element overlap between an SSB 305 associated with a PCI for cell 320-*b*, such as a non-serving cell PCI, and a PDSCH 315 associated with the PCI for cell 320-*a*, such as a serving-cell PCI. The UE may expect overlap between the resource elements for a DMRS 310 of the PDSCH 315 and resource elements of the SSB 305.

FIG. 4 illustrates an example of a transmission diagram 400 that supports resource element overlap between an SSB and DMRS in accordance with aspects of the present disclosure. In some examples, transmission diagram 400 may implement aspects of wireless communications system 100, wireless communications system 200, and resource diagram 300. For example, transmission diagram 400 may be implemented by a UE 115 and a base station 105 as described with reference to FIGS. 1 and 2. In some cases, a base station may transmit an SSB and a DMRS in a downlink shared channel to a UE. The resource elements of the SSB and the DMRS may overlap according to whether the downlink shared channel is associated with a serving cell PCI or another PCI, such as a non-serving cell PCI.

In some examples, a UE may determine whether a downlink shared channel (e.g., a PDSCH) is associated with a serving cell PCI or another PCI for a different cell based on an indirect QCL relationship, such as a top QCL chain 405. In some cases, a TCI state or a QCL assumption for a PDSCH may be based on a CSI-RS or tracking reference signal (TRS). The CSI-RS or TRS may be directly or indirectly QCLed with an SSB. For example, for QCL chain 405-*a*, at 410 an SSB may be QCLed with a CSI-RS associated with a TRS at 415, a CSI-RS at 420, and finally a PDSCH at 425. Similarly, for QCL chain 405-*b*, at 430 an SSB may be QCLed with a CSI-RS associated with a TRS at 435, and a PDSCH at 440. In some cases, if the SSB at the top QCL chain of a PDSCH is associated with serving cell PCI, the PDSCH may also be associated with the serving cell PCI. In some other cases, if the SSB at the top QCL chain of a PDSCH is associated with another PCI, such as a non-serving cell PCI, the PDSCH may also be associated with the other PCI.

Figure 5:
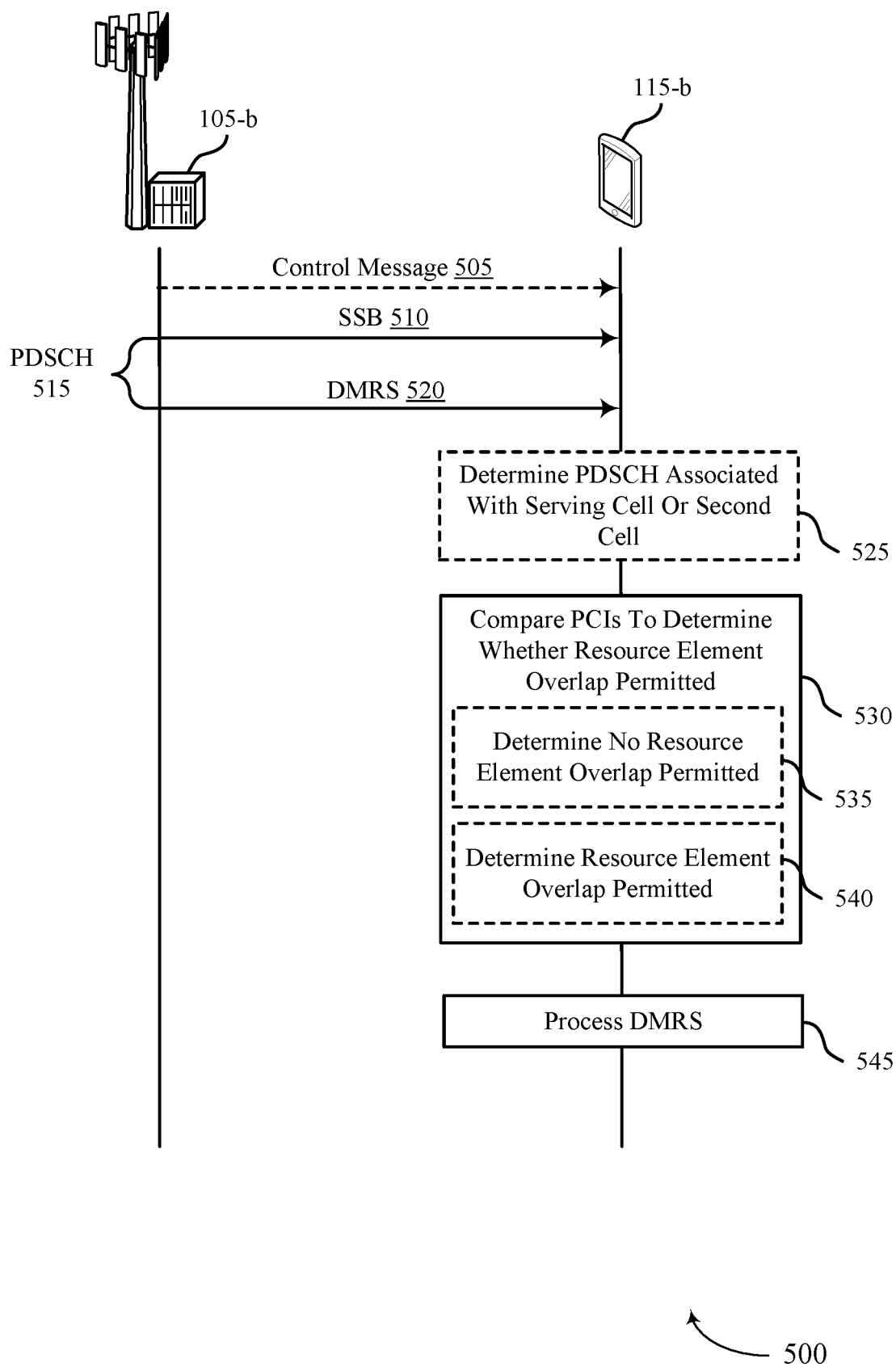
FIG. 5 illustrates an example of a process flow that supports resource element overlap between an SSB and DMRS in accordance with aspects of the present disclosure.

FIG. 5 illustrates an example of a process flow 500 that supports resource element overlap between an SSB and DMRS in accordance with aspects of the present disclosure. In some examples, process flow 500 may implement aspects of wireless communications system 100, wireless communications system 200, resource diagram 300 and transmission diagram 400. The process flow 500 may illustrate an example of a UE 115-*b* determining whether overlap is permitted between one or more resource elements carrying an SSB and one or more resource elements carrying a DMRS on a downlink shared channel from a base station 105-*b*. Alternative examples of the following may be implemented, where some processes are performed in a different order than described or are not performed. In some cases, processes may include additional features not mentioned below, or further processes may be added.

At 505, base station 105-*b* may transmit a control message to UE 115-*b*. For example, base station 105-*b* may transmit a dynamic control message, such as a DCI message, or an SPS control message, such as an RRC configuration or a MAC-CE with an activating DCI. In some examples, UE 115-*b* may receive the control message in accordance with a CORESET, which may have a CORESET pool index value. For example, the control message may be an SPS control message with an activating DCI message received in a CORESET with the CORESET pool index value. In some other examples, the control message may be an SPS control message with an SPS configuration in an RRC message, the SPS configuration indicating the CORESET pool index value.

At 510, UE 115-*b* may receive an SSB with a PCI, such as a PCI for a serving cell or another cell (e.g., non-serving cell). In some cases, one or more resource elements carrying the SSB may overlap with one or more resource elements carrying a downlink shared channel, such as PDSCH 515, with another PCI.

At 520, UE 115-*b* may receive one or more DMRSs from base station 105-*b*. For example, UE 115-*b* may receive a DMRS in a downlink shared channel, such as PDSCH 515.

At 525, UE 115-*b* may determine whether the PCI of the downlink shared channel, such as the PCI of the PDSCH 515, is for a serving cell or another cell, such as a non-serving cell. In some cases, if UE 115-*b* receives a scheduling DCI in a CORESET with a CORESET pool index value, UE 115-*b* may use that CORESET pool index value to determine whether the downlink shared channel has a PCI associated with the serving cell or the other cell. For example, UE 115-*b* may determine the downlink shared channel may be for a serving cell based on the CORESET pool index value being zero. In some other examples, UE 115-*b* may determine the downlink shared channel may be for another cell (e.g., a non-serving cell) based on the CORESET pool index value being one.

In some cases, UE 115-*b* may determine the downlink shared channel may be associated with a serving cell or another cell (e.g., a non-serving cell) based on a QCL relationship of the SSB being associated with the serving cell or the other cell, respectively.

At 530, UE 115-*b* may compare PCIs of the SSB and the PDSCH with the DMRS to determine whether resource element overlap is permitted. For example, UE 115-*b* may determine whether overlap is permitted between the one or more resource elements carrying the SSB and one or more resource elements carrying a DMRS in the downlink shared channel.

In some examples, at 535, UE 115-*b* may determine no resource element overlap is permitted. For example, UE 115-*b* may determine that no overlap is permitted between the one or more resource elements carrying the SSB and the one or more resource elements carrying the DMRS based on both of the PCIs being for a serving cell or another cell, such as the non-serving cell.

In some other examples, at 540, UE 115-*b* may determine resource element overlap is permitted. For example, UE 115-*b* may determine that overlap is permitted between the one or more resource elements carrying the SSB and the one or more resource elements carrying the DMRS based on a least one of the PCIs being for a serving cell and the other PCI being for the other cell.

At 545, UE 115-*b* may process the DMRS based on determining whether the resource element overlap is permitted at 530.

Figure 6:
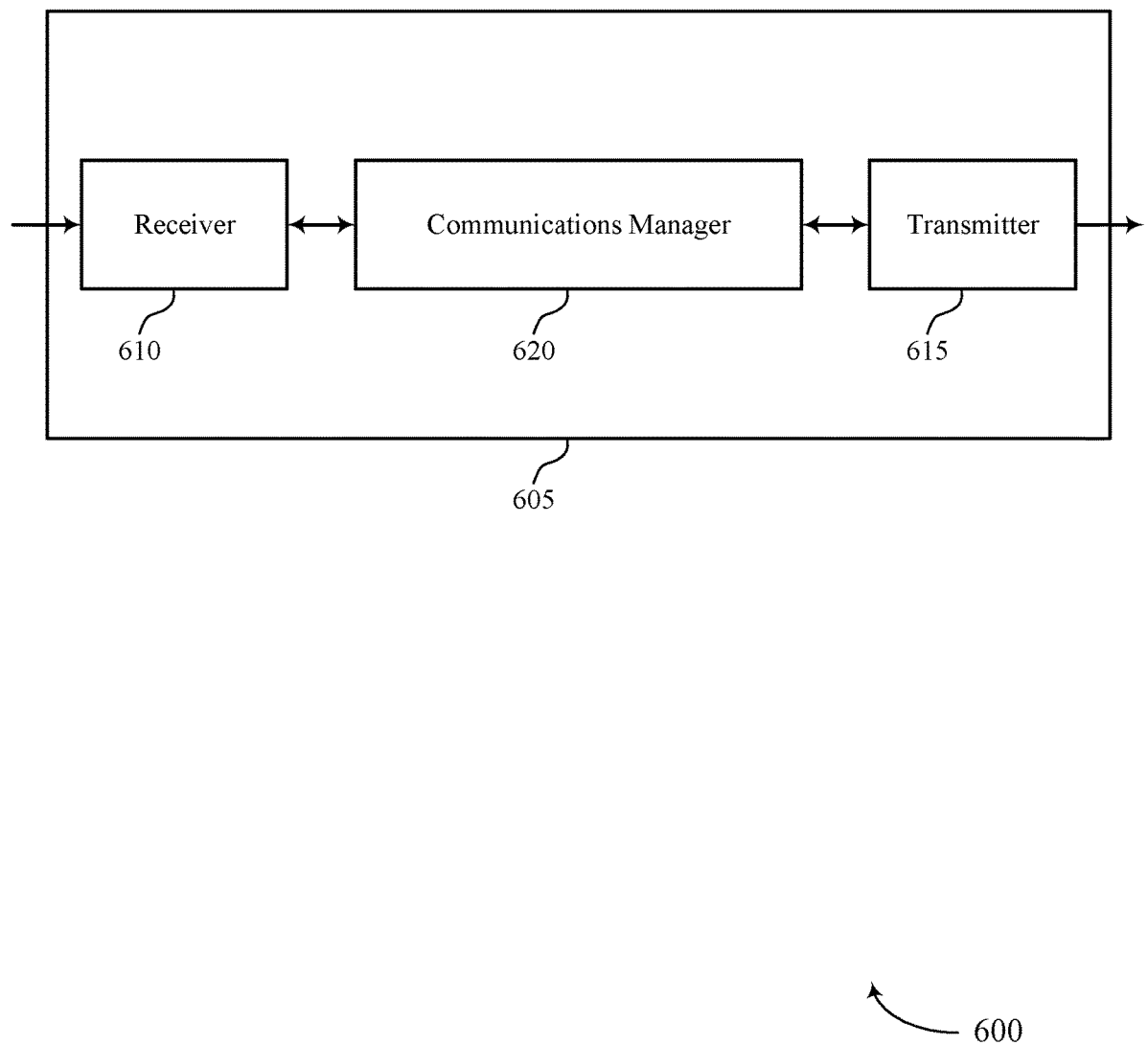
FIGS. 6 and 7 show block diagrams of devices that support resource element overlap between an SSB and DMRS in accordance with aspects of the present disclosure.

FIG. 6 shows a block diagram 600 of a device 605 that supports resource element overlap between an SSB and DMRS in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource element overlap between an SSB and DMRS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource element overlap between an SSB and DMRS). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource element overlap between an SSB and DMRS as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving an SSB associated with a first PCI, where one or more resource elements carrying the SSB overlap with one or more resource elements carrying a downlink shared channel associated with a second PCI. The communications manager 620 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The communications manager 620 may be configured as or otherwise support a means for processing the DMRS based on the determination.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE 115 to determine whether overlap is permitted between one or more resource elements carrying an SSB and one or more resource elements carrying a DMRS on a downlink shared channel, which may cause reduced processing, reduced power consumption, more efficient utilization of communication resources, and the like.

Figure 7:
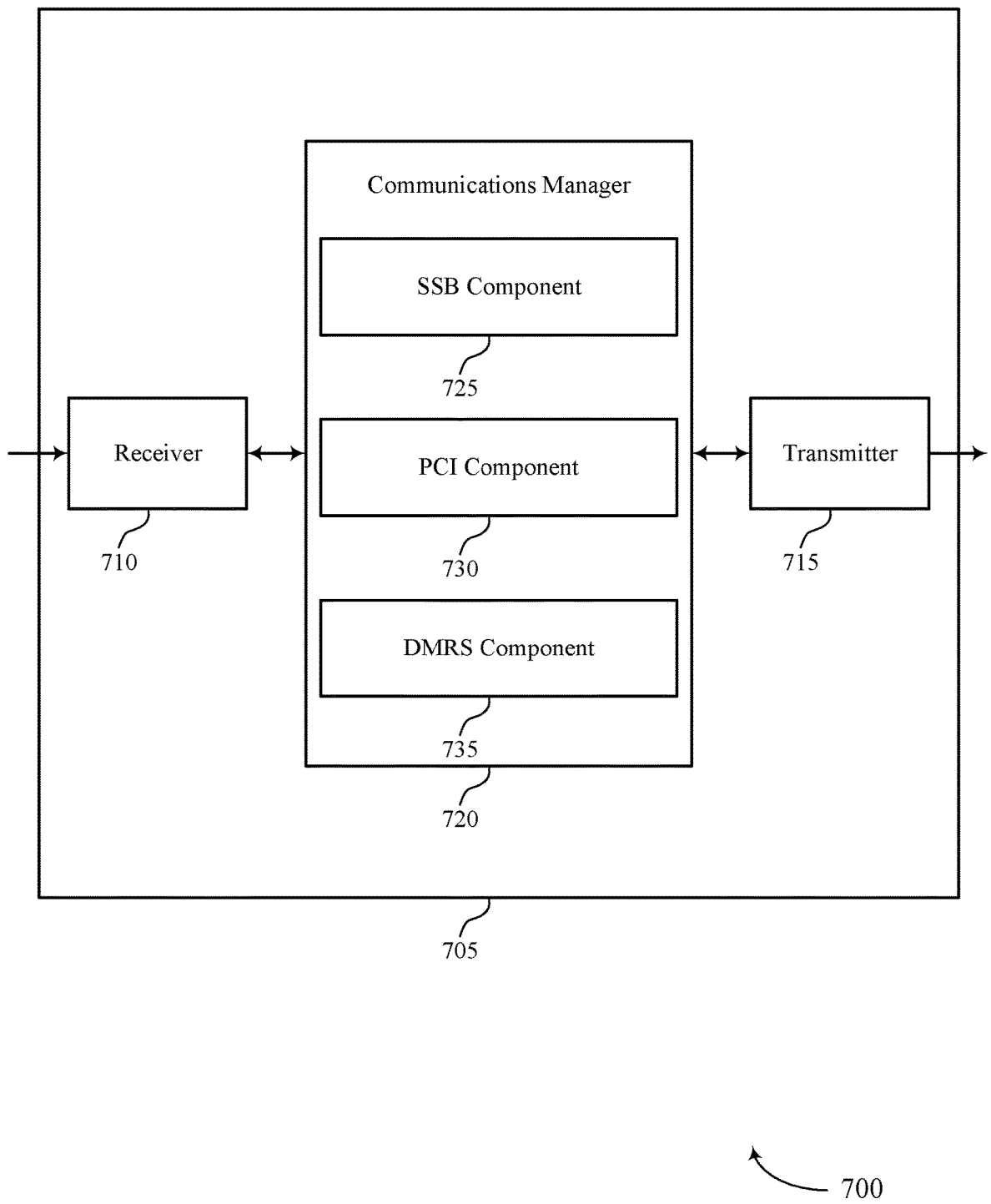

FIG. 7 shows a block diagram 700 of a device 705 that supports resource element overlap between an SSB and DMRS in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource element overlap between an SSB and DMRS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource element overlap between an SSB and DMRS). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource element overlap between an SSB and DMRS as described herein. For example, the communications manager 720 may include an SSB component 725, a PCI component 730, a DMRS component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The SSB component 725 may be configured as or otherwise support a means for receiving an SSB associated with a first PCI, where one or more resource elements carrying the SSB overlap with one or more resource elements carrying a downlink shared channel associated with a second PCI. The PCI component 730 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The DMRS component 735 may be configured as or otherwise support a means for processing the DMRS based on the determination.

Figure 8:
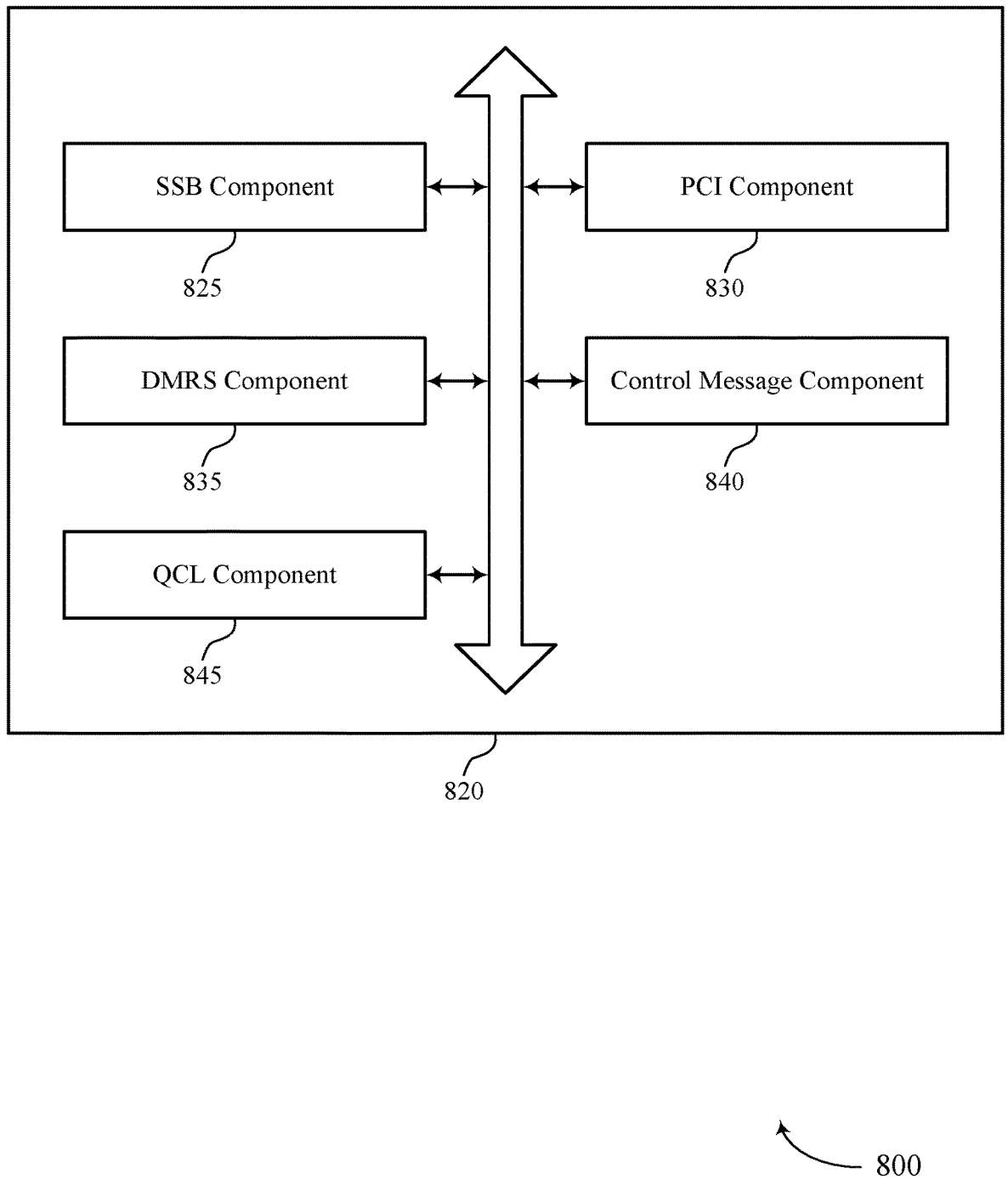
FIG. 8 shows a block diagram of a communications manager that supports resource element overlap between an SSB and DMRS in accordance with aspects of the present disclosure.

FIG. 8 shows a block diagram 800 of a communications manager 820 that supports resource element overlap between an SSB and DMRS in accordance with aspects of the present disclosure. The communications manager 820 may be an example of aspects of a communications manager 620, a communications manager 720, or both, as described herein. The communications manager 820, or various components thereof, may be an example of means for performing various aspects of resource element overlap between an SSB and DMRS as described herein. For example, the communications manager 820 may include an SSB component 825, a PCI component 830, a DMRS component 835, a control message component 840, a QCL component 845, or any combination thereof. Each of these components may communicate, directly or indirectly, with one another (e.g., via one or more buses).

The communications manager 820 may support wireless communications at a UE in accordance with examples as disclosed herein. The SSB component 825 may be configured as or otherwise support a means for receiving an SSB associated with a first PCI, where one or more resource elements carrying the SSB overlap with one or more resource elements carrying a downlink shared channel associated with a second PCI. The PCI component 830 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The DMRS component 835 may be configured as or otherwise support a means for processing the DMRS based on the determination.

In some examples, to support determining whether overlap is permitted, the PCI component 830 may be configured as or otherwise support a means for determining that no overlap is permitted between the one or more resource elements carrying the SSB and the one or more resource elements carrying the DMRS based on the first PCI and the second PCI corresponding to a serving cell.

In some examples, to support determining whether overlap is permitted, the PCI component 830 may be configured as or otherwise support a means for determining that no overlap is permitted between the one or more resource elements carrying the SSB and the one or more resource elements carrying the DMRS based on the first PCI and the second PCI being a same PCI.

In some examples, to support determining whether overlap is permitted, the PCI component 830 may be configured as or otherwise support a means for determining that no overlap is permitted between the one or more resource elements carrying the SSB and the one or more resource elements carrying the DMRS based on the first PCI and the second PCI corresponding to a second cell.

In some examples, to support determining whether overlap is permitted, the PCI component 830 may be configured as or otherwise support a means for determining that overlap is permitted between the one or more resource elements carrying the SSB and the one or more resource elements carrying the DMRS based on the first PCI corresponding to a serving cell and the second PCI corresponding to a second cell.

In some examples, to support determining whether overlap is permitted, the PCI component 830 may be configured as or otherwise support a means for determining that overlap is permitted between the one or more resource elements carrying the SSB and the one or more resource elements carrying the DMRS based on the first PCI corresponding to a second cell and the second PCI corresponding to a serving cell.

In some examples, the control message component 840 may be configured as or otherwise support a means for receiving a control message corresponding to a CORESET pool index value corresponding to the downlink shared channel, the control message including a scheduling DCI message.

In some examples, the control message component 840 may be configured as or otherwise support a means for determining the downlink shared channel is associated with a serving cell based on the CORESET pool index value having a value of zero.

In some examples, the control message component 840 may be configured as or otherwise support a means for determining the downlink shared channel is associated with a second cell based on the CORESET pool index value having a value of one.

In some examples, the control message is an SPS control message corresponding to an activating DCI message received in a CORESET associated with the CORESET pool index value.

In some examples, the control message is an SPS control message corresponding to SPS configuration in an RRC message, the SPS configuration indicating the CORESET pool index value.

In some examples, the QCL component 845 may be configured as or otherwise support a means for determining the downlink shared channel is associated with a serving cell based on a QCL relationship corresponding to the SSB being associated with the serving cell.

In some examples, the QCL component 845 may be configured as or otherwise support a means for determining the downlink shared channel is associated with a second cell based on a QCL relationship corresponding to the SSB being associated with the second cell.

Figure 9:
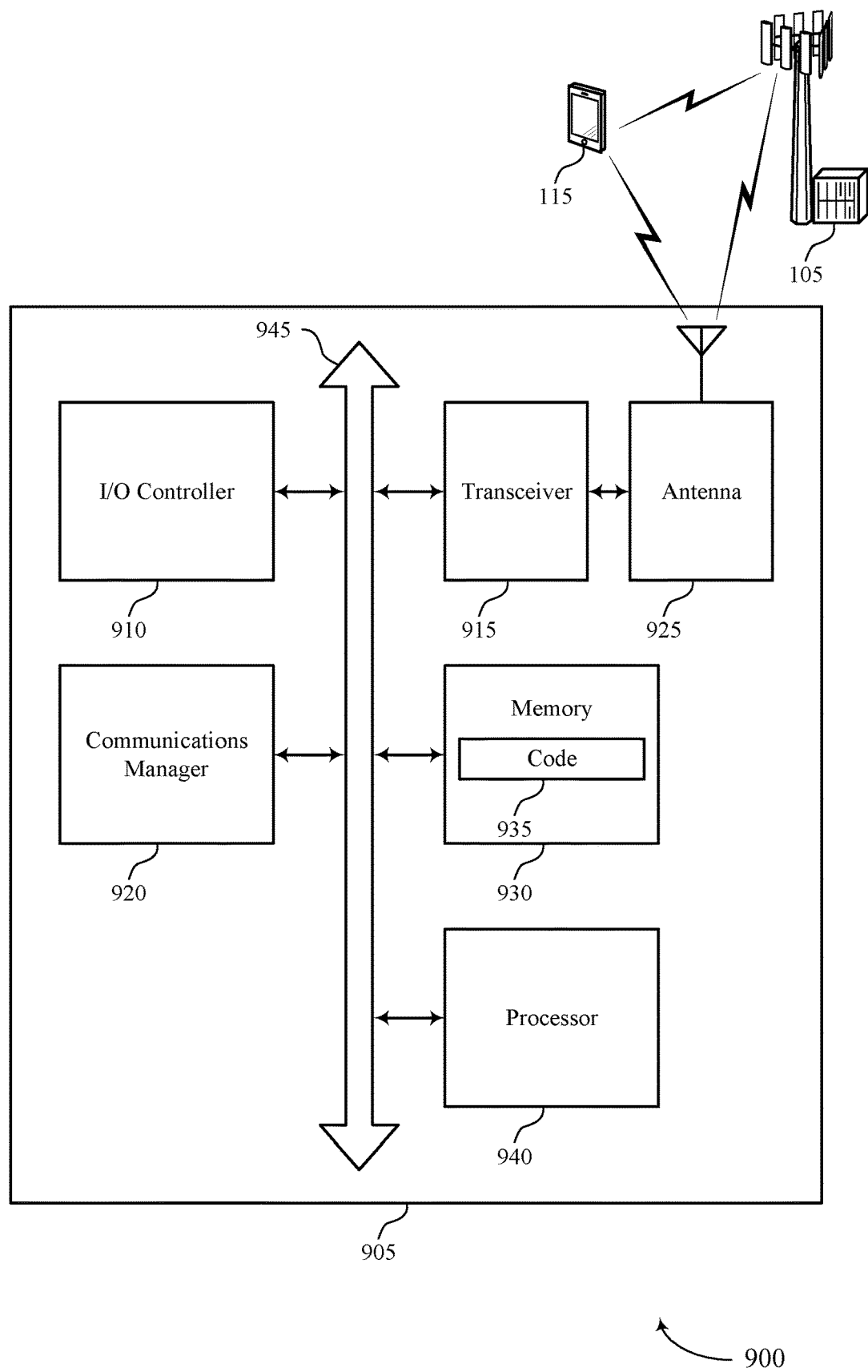
FIG. 9 shows a diagram of a system including a device that supports resource element overlap between an SSB and DMRS in accordance with aspects of the present disclosure.

FIG. 9 shows a diagram of a system 900 including a device 905 that supports resource element overlap between an SSB and DMRS in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource element overlap between an SSB and DMRS). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving an SSB associated with a first PCI, where one or more resource elements carrying the SSB overlap with one or more resource elements carrying a downlink shared channel associated with a second PCI. The communications manager 920 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The communications manager 920 may be configured as or otherwise support a means for processing the DMRS based on the determination.

By including or configuring the communications manager 920 in accordance with examples as described herein, the device 905 may support techniques for a UE 115 to determine whether overlap is permitted between one or more resource elements carrying an SSB and one or more resource elements carrying a DMRS on a downlink shared channel, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource element overlap between an SSB and DMRS as described herein, or the processor 940 and the memory 930 may be otherwise configured to perform or support such operations.

Figure 10:
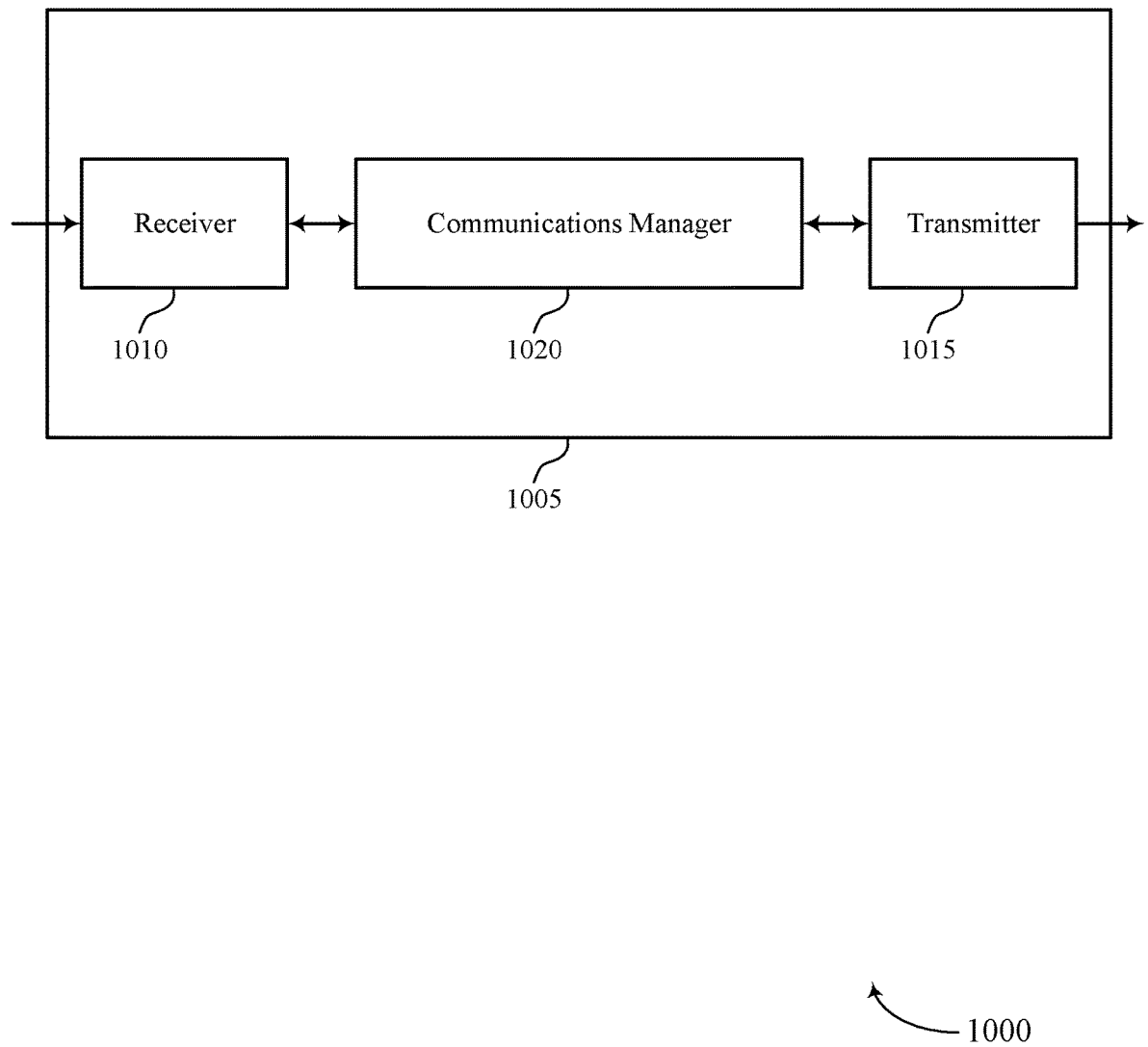
FIGS. 10 and 11 show block diagrams of devices that support resource element overlap between an SSB and DMRS in accordance with aspects of the present disclosure.

FIG. 10 shows a block diagram 1000 of a device 1005 that supports resource element overlap between an SSB and DMRS in accordance with aspects of the present disclosure. The device 1005 may be an example of a network entity implementing one or more aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource element overlap between an SSB and DMRS). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resource element overlap between an SSB and DMRS). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of resource element overlap between an SSB and DMRS as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity implementing one or more aspects of a base station in accordance with examples as disclosed herein. For example, the communications manager 1020 may be configured as or otherwise support a means for transmitting an SSB associated with a first PCI, where one or more resource elements carrying the SSB overlap with one or more resource elements carrying a downlink shared channel associated with a second PCI. The communications manager 1020 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The communications manager 1020 may be configured as or otherwise support a means for processing the DMRS based on the determination.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a UE 115 to determine whether overlap is permitted between one or more resource elements carrying an SSB and one or more resource elements carrying a DMRS on a downlink shared channel, which may cause reduced processing, reduced power consumption, more efficient utilization of communication resources, and the like.

Figure 11:
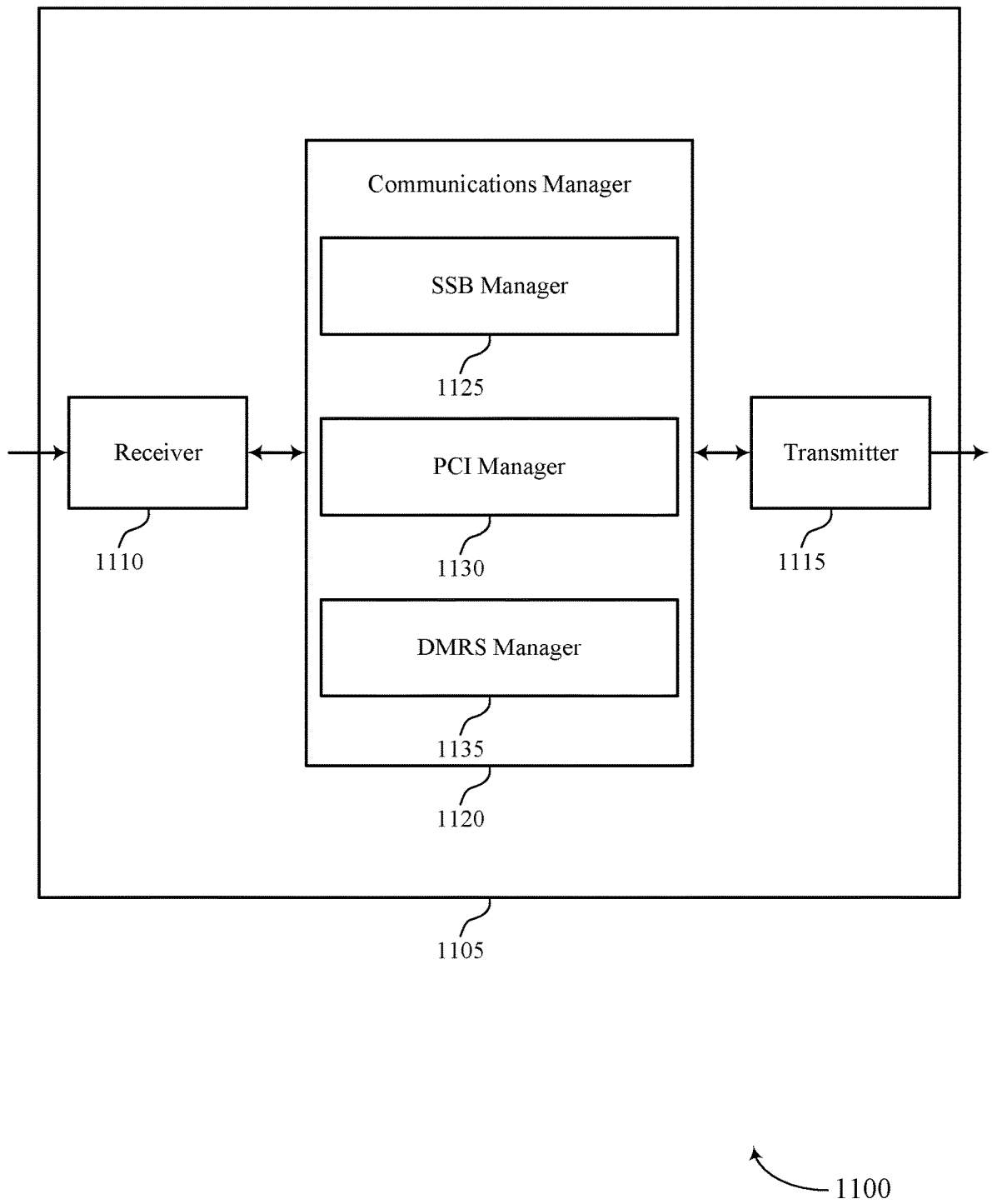

FIG. 11 shows a block diagram 1100 of a device 1105 that supports resource element overlap between an SSB and DMRS in accordance with aspects of the present disclosure. The device 1105 may be an example of aspects of a device 1005 or one or more aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to resource element overlap between an SSB and DMRS). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to resource element overlap between an SSB and DMRS). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of resource element overlap between an SSB and DMRS as described herein. For example, the communications manager 1120 may include an SSB manager 1125, a PCI manager 1130, a DMRS manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity implementing one or more aspects of a base station in accordance with examples as disclosed herein. The SSB manager 1125 may be configured as or otherwise support a means for transmitting an SSB associated with a first PCI, where one or more resource elements carrying the SSB overlap with one or more resource elements carrying a downlink shared channel associated with a second PCI. The PCI manager 1130 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The DMRS manager 1135 may be configured as or otherwise support a means for processing the DMRS based on the determination.

Figure 12:
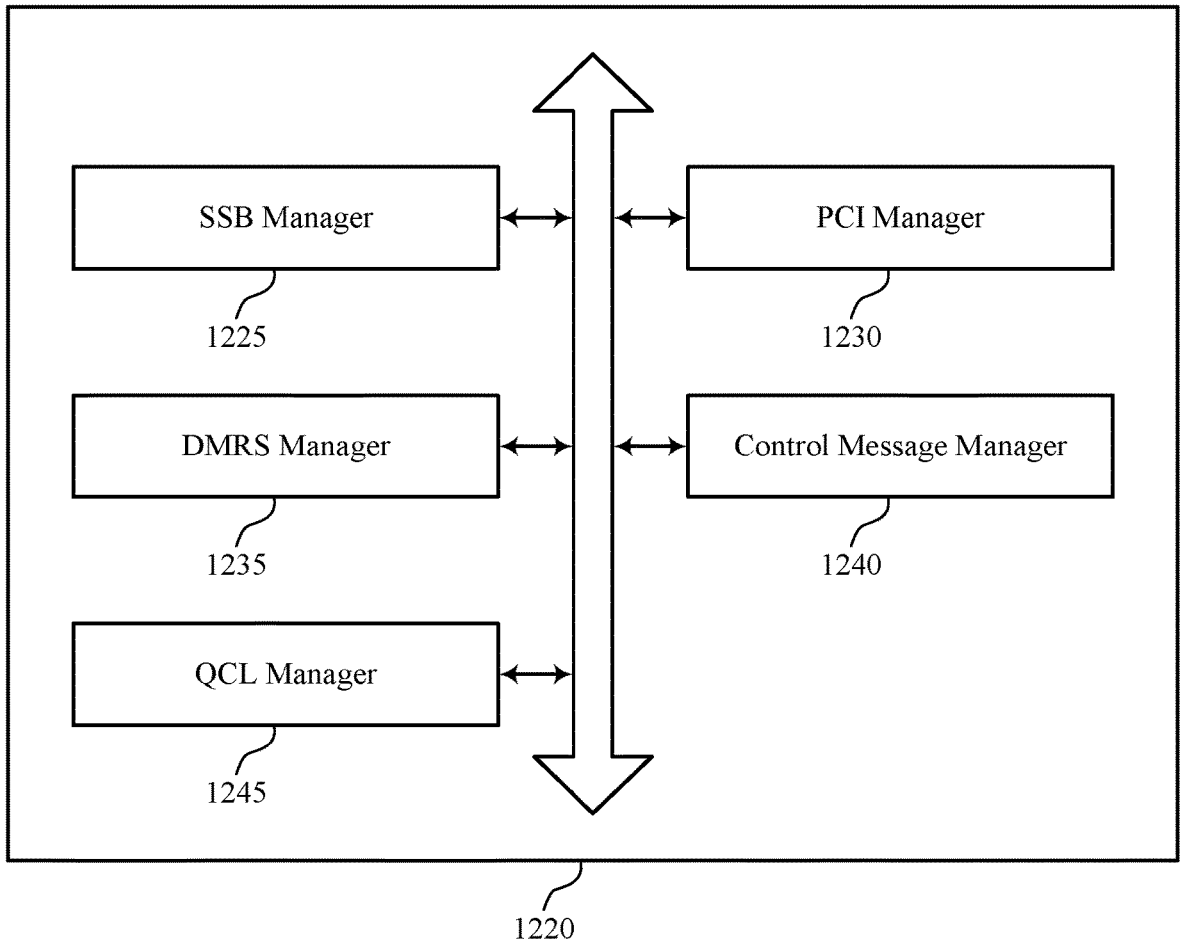
FIG. 12 shows a block diagram of a communications manager that supports resource element overlap between an SSB and DMRS in accordance with aspects of the present disclosure.

FIG. 12 shows a block diagram 1200 of a communications manager 1220 that supports resource element overlap between an SSB and DMRS in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of resource element overlap between an SSB and DMRS as described herein. For example, the communications manager 1220 may include an SSB manager 1225, a PCI manager 1230, a DMRS manager 1235, a control message manager 1240, a QCL manager 1245, or any combination thereof. Each of these components may communicate, directly or indirectly, with one another (e.g., via one or more buses).

The communications manager 1220 may support wireless communications at a network entity implementing one or more aspects of a base station in accordance with examples as disclosed herein. The SSB manager 1225 may be configured as or otherwise support a means for transmitting an SSB associated with a first PCI, where one or more resource elements carrying the SSB overlap with one or more resource elements carrying a downlink shared channel associated with a second PCI. The PCI manager 1230 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The DMRS manager 1235 may be configured as or otherwise support a means for processing the DMRS based on the determination.

In some examples, the PCI manager 1230 may be configured as or otherwise support a means for determining there is no overlap between the one or more resource elements carrying the SSB and the one or more resource elements carrying the DMRS based on the first PCI and the second PCI corresponding to a serving cell.

In some examples, the PCI manager 1230 may be configured as or otherwise support a means for determining there is no overlap between the one or more resource elements carrying the SSB and the one or more resource elements carrying the DMRS based on the first PCI and the second PCI being a same PCI.

In some examples, the PCI manager 1230 may be configured as or otherwise support a means for determining there is no overlap between the one or more resource elements carrying the SSB and the one or more resource elements carrying the DMRS based on the first PCI and the second PCI corresponding to a second cell.

In some examples, the PCI manager 1230 may be configured as or otherwise support a means for determining the one or more resource elements carrying the SSB and the one or more resource elements carrying the DMRS overlap based on the first PCI corresponding to a serving cell and the second PCI corresponding to a second cell.

In some examples, the PCI manager 1230 may be configured as or otherwise support a means for determining the one or more resource elements carrying the SSB and the one or more resource elements carrying the DMRS overlap based on the first PCI corresponding to a second cell and the second PCI corresponding to a serving cell.

In some examples, the control message manager 1240 may be configured as or otherwise support a means for transmitting a control message indicating a CORESET pool index value corresponding to the downlink shared channel.

In some examples, the control message manager 1240 may be configured as or otherwise support a means for determining the downlink shared channel is associated with a serving cell based on the CORESET pool index value having a value of zero.

In some examples, the control message manager 1240 may be configured as or otherwise support a means for determining the downlink shared channel is associated with a second cell based on the CORESET pool index value having a value of one.

In some examples, the control message is an SPS control message corresponding to an activating DCI message received in a CORESET associated with the CORESET pool index value.

In some examples, the control message is an SPS control message corresponding to SPS configuration in an RRC message, the SPS configuration indicating the CORESET pool index value.

In some examples, the QCL manager 1245 may be configured as or otherwise support a means for determining the downlink shared channel is associated with a serving cell based on a QCL relationship corresponding to the SSB being associated with the serving cell.

In some examples, the QCL manager 1245 may be configured as or otherwise support a means for determining the downlink shared channel is associated with a second cell based on a QCL relationship corresponding to the SSB being associated with the second cell.

Figure 13:
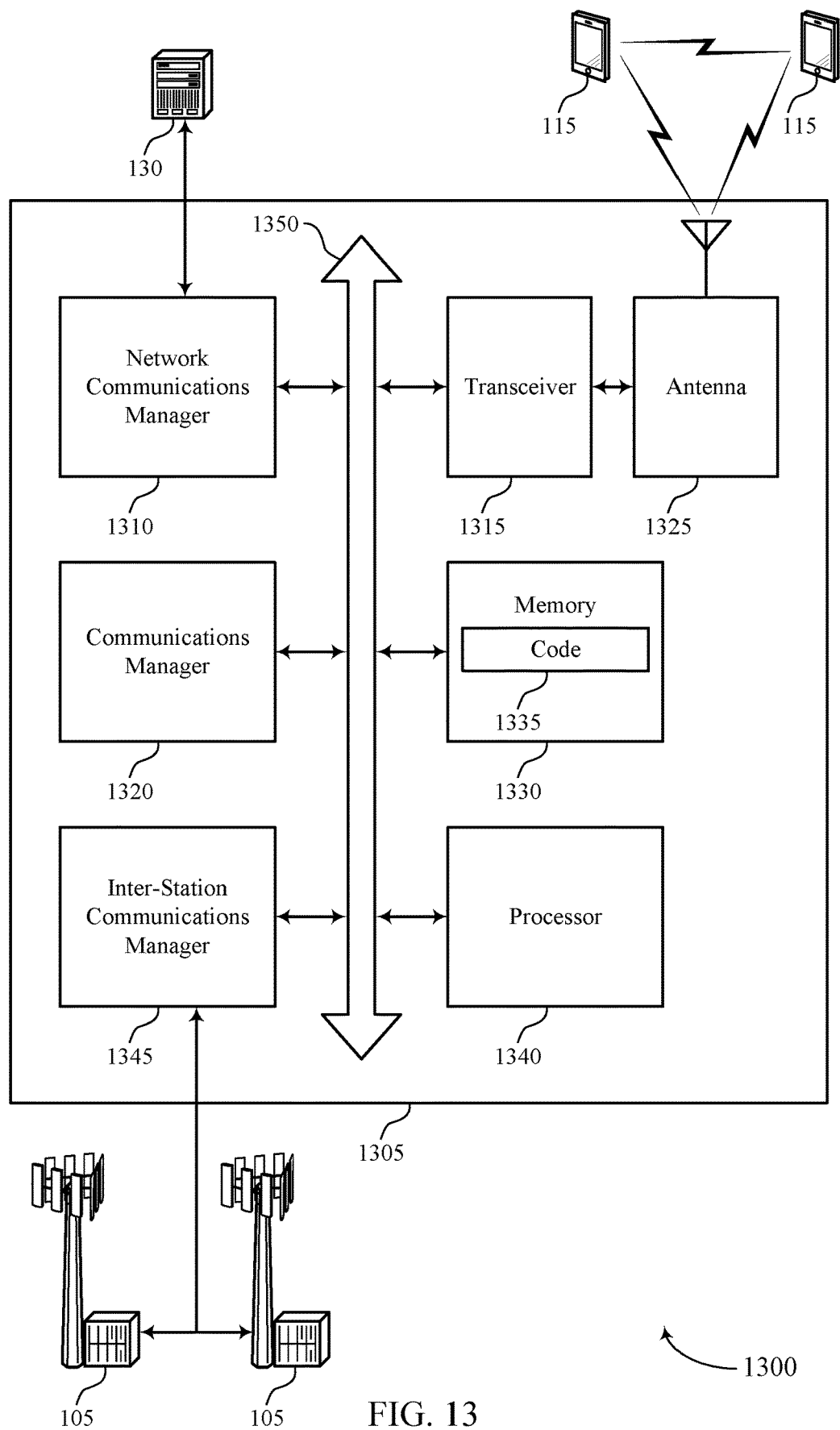
FIG. 13 shows a diagram of a system including a device that supports resource element overlap between an SSB and DMRS in accordance with aspects of the present disclosure.

FIG. 13 shows a diagram of a system 1300 including a device 1305 that supports resource element overlap between an SSB and DMRS in accordance with aspects of the present disclosure. The device 1305 may be an example of or include the components of a device 1005, a device 1105, or a network entity implementing one or more aspects of a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource element overlap between an SSB and DMRS). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a network entity implementing one or more aspects of a base station in accordance with examples as disclosed herein. For example, the communications manager 1320 may be configured as or otherwise support a means for transmitting an SSB associated with a first PCI, where one or more resource elements carrying the SSB overlap with one or more resource elements carrying a downlink shared channel associated with a second PCI. The communications manager 1320 may be configured as or otherwise support a means for determining, according to a comparison of the first PCI and the second PCI, whether overlap is permitted between the one or more resource elements carrying the SSB and one or more resource elements carrying a DMRS corresponding to the downlink shared channel. The communications manager 1320 may be configured as or otherwise support a means for processing the DMRS based on the determination.

By including or configuring the communications manager 1320 in accordance with examples as described herein, the device 1305 may support techniques for a UE 115 to determine whether overlap is permitted between one or more resource elements carrying an SSB and one or more resource elements carrying a DMRS on a downlink shared channel, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of resource element overlap between an SSB and DMRS as described herein, or the processor 1340 and the memory 1330 may be otherwise configured to perform or support such operations.

Figure 14:
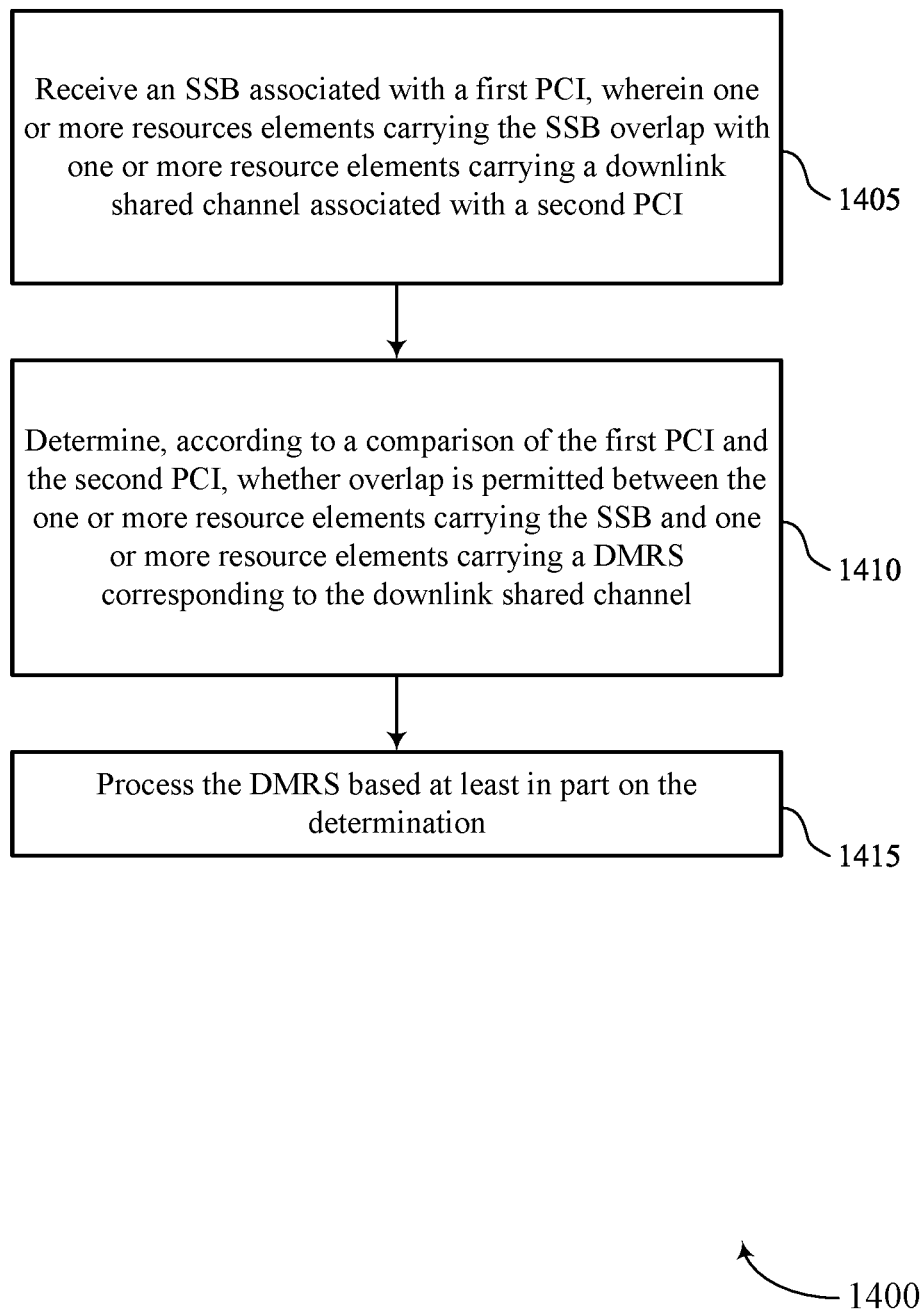
FIGS. 14 through 19 show flowcharts illustrating methods that support resource element overlap between an SSB and DMRS in accordance with aspects of the present disclosure.

FIG. 14 shows a flowchart illustrating a method 1400 that supports resource element overlap between an SSB and DMRS in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving an SSB associated with a first PCI, where one or more resource elements carrying the SSB overlap with one or more resource elements carrying a downlink shared channel associated with a second PCI. The operations of 1405 may be performed in accordance with examples as disclosed herein. In some examples, aspects of the operations of 1405 may be performed by an SSB component 825 as described with reference to FIG. 8.

At 1410, the method may include determining, according to a comparison of the first PCI and the second PCI, whether overlap is permitted between the one or more resource elements carrying the SSB and one or more resource elements carrying a DMRS corresponding to the downlink shared channel. The operations of 1410 may be performed in accordance with examples as disclosed herein. In some examples, aspects of the operations of 1410 may be performed by a PCI component 830 as described with reference to FIG. 8.

At 1415, the method may include processing the DMRS based on the determination. The operations of 1415 may be performed in accordance with examples as disclosed herein.

In some examples, aspects of the operations of 1415 may be performed by a DMRS component 835 as described with reference to FIG. 8.

Figure 15:
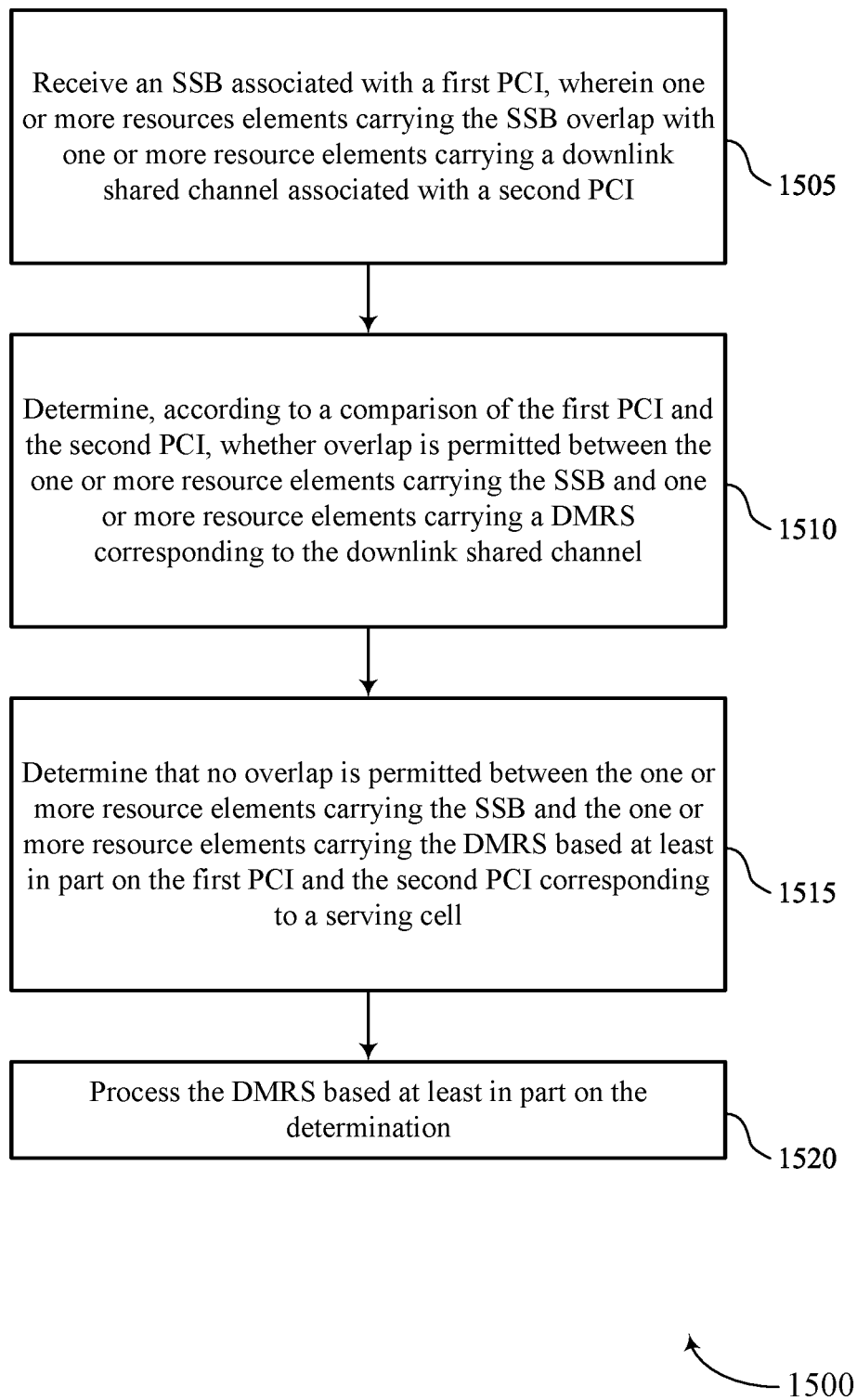

FIG. 15 shows a flowchart illustrating a method 1500 that supports resource element overlap between an SSB and DMRS in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving an SSB associated with a first PCI, where one or more resource elements carrying the SSB overlap with one or more resource elements carrying a downlink shared channel associated with a second PCI. The operations of 1505 may be performed in accordance with examples as disclosed herein. In some examples, aspects of the operations of 1505 may be performed by an SSB component 825 as described with reference to FIG. 8.

At 1510, the method may include determining, according to a comparison of the first PCI and the second PCI, whether overlap is permitted between the one or more resource elements carrying the SSB and one or more resource elements carrying a DMRS corresponding to the downlink shared channel. The operations of 1510 may be performed in accordance with examples as disclosed herein. In some examples, aspects of the operations of 1510 may be performed by a PCI component 830 as described with reference to FIG. 8.

At 1515, the method may include determining that no overlap is permitted between the one or more resource elements carrying the SSB and the one or more resource elements carrying the DMRS based on the first PCI and the second PCI corresponding to a serving cell, or being the same. The operations of 1515 may be performed in accordance with examples as disclosed herein. In some examples, aspects of the operations of 1515 may be performed by a PCI component 830 as described with reference to FIG. 8.

At 1520, the method may include processing the DMRS based on the determination. The operations of 1520 may be performed in accordance with examples as disclosed herein. In some examples, aspects of the operations of 1520 may be performed by a DMRS component 835 as described with reference to FIG. 8.

Figure 16:
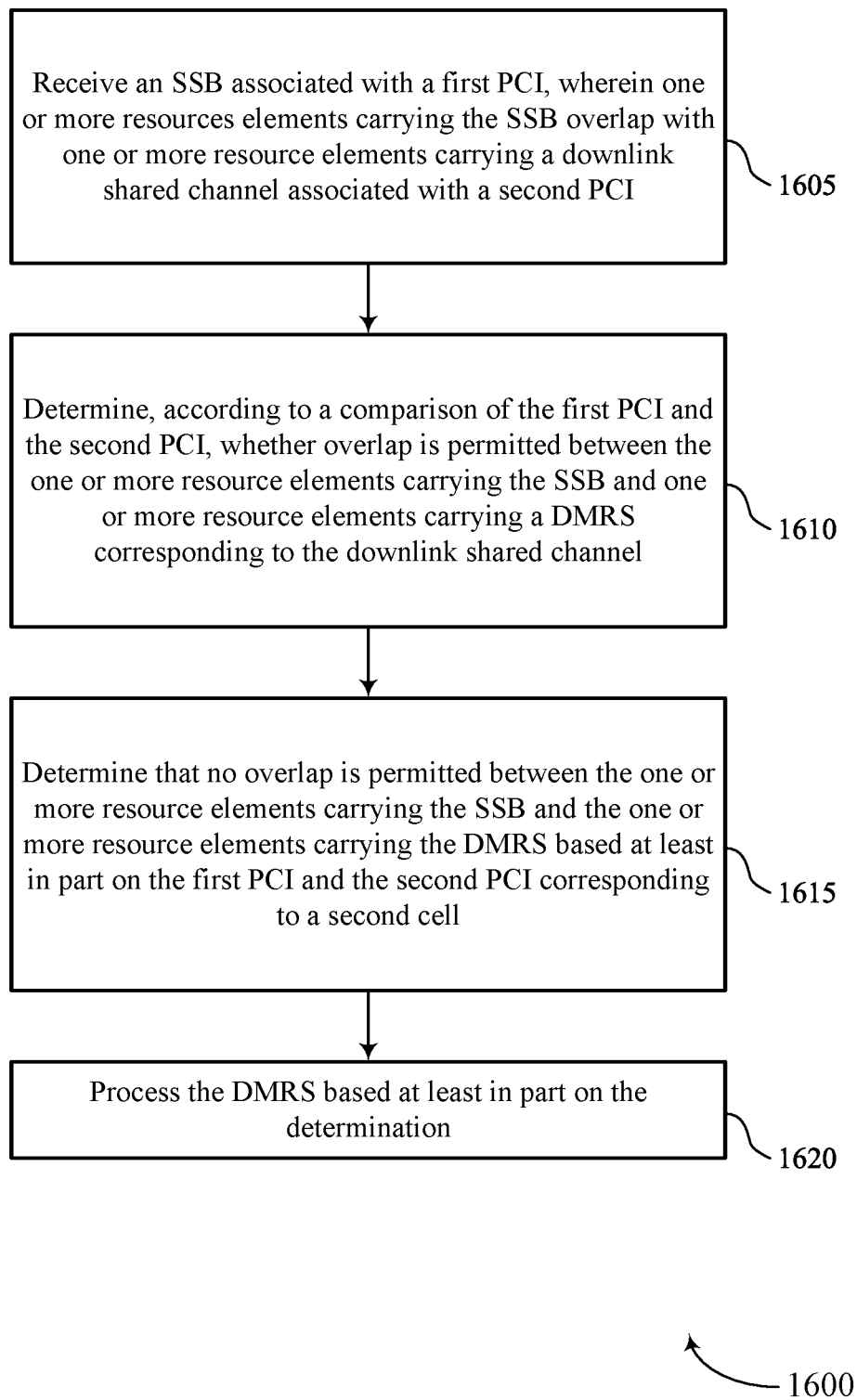

FIG. 16 shows a flowchart illustrating a method 1600 that supports resource element overlap between an SSB and DMRS in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving an SSB associated with a first PCI, where one or more resource elements carrying the SSB overlap with one or more resource elements carrying a downlink shared channel associated with a second PCI. The operations of 1605 may be performed in accordance with examples as disclosed herein.

In some examples, aspects of the operations of 1605 may be performed by an SSB component 825 as described with reference to FIG. 8.

At 1610, the method may include determining, according to a comparison of the first PCI and the second PCI, whether overlap is permitted between the one or more resource elements carrying the SSB and one or more resource elements carrying a DMRS corresponding to the downlink shared channel. The operations of 1610 may be performed in accordance with examples as disclosed herein. In some examples, aspects of the operations of 1610 may be performed by a PCI component 830 as described with reference to FIG. 8.

At 1615, the method may include determining that no overlap is permitted between the one or more resource elements carrying the SSB and the one or more resource elements carrying the DMRS based on the first PCI and the second PCI corresponding to a second cell. The operations of 1615 may be performed in accordance with examples as disclosed herein. In some examples, aspects of the operations of 1615 may be performed by a PCI component 830 as described with reference to FIG. 8.

At 1620, the method may include processing the DMRS based on the determination. The operations of 1620 may be performed in accordance with examples as disclosed herein. In some examples, aspects of the operations of 1620 may be performed by a DMRS component 835 as described with reference to FIG. 8.

Figure 17:
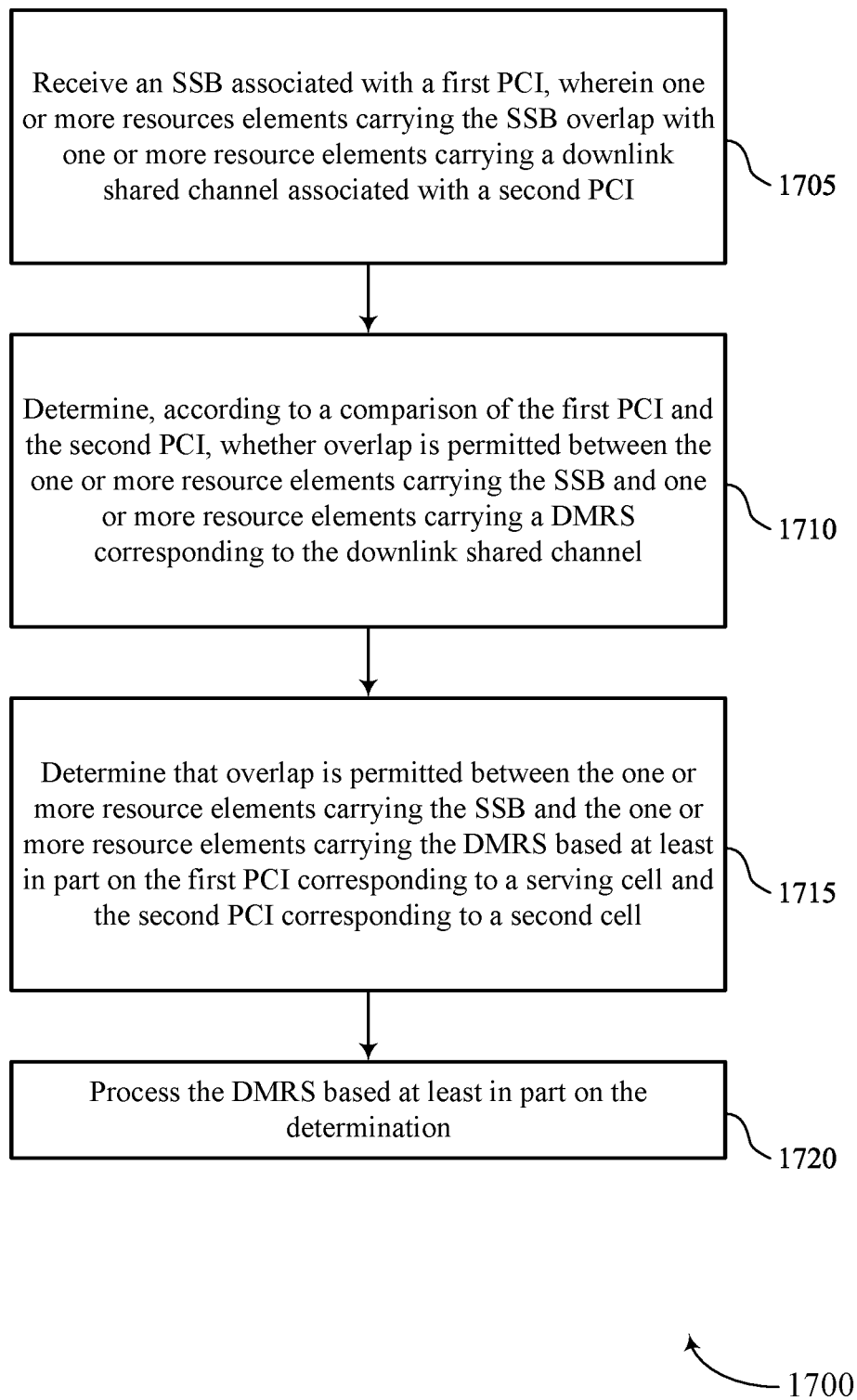

FIG. 17 shows a flowchart illustrating a method 1700 that supports resource element overlap between an SSB and DMRS in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving an SSB associated with a first PCI, where one or more resource elements carrying the SSB overlap with one or more resource elements carrying a downlink shared channel associated with a second PCI. The operations of 1705 may be performed in accordance with examples as disclosed herein. In some examples, aspects of the operations of 1705 may be performed by an SSB component 825 as described with reference to FIG. 8.

At 1710, the method may include determining, according to a comparison of the first PCI and the second PCI, whether overlap is permitted between the one or more resource elements carrying the SSB and one or more resource elements carrying a DMRS corresponding to the downlink shared channel. The operations of 1710 may be performed in accordance with examples as disclosed herein. In some examples, aspects of the operations of 1710 may be performed by a PCI component 830 as described with reference to FIG. 8.

At 1715, the method may include determining that overlap is permitted between the one or more resource elements carrying the SSB and the one or more resource elements carrying the DMRS based on the first PCI corresponding to a serving cell and the second PCI corresponding to a second cell. The operations of 1715 may be performed in accordance with examples as disclosed herein. In some examples, aspects of the operations of 1715 may be performed by a PCI component 830 as described with reference to FIG. 8.

At 1720, the method may include processing the DMRS based on the determination. The operations of 1720 may be performed in accordance with examples as disclosed herein. In some examples, aspects of the operations of 1720 may be performed by a DMRS component 835 as described with reference to FIG. 8.

Figure 18:
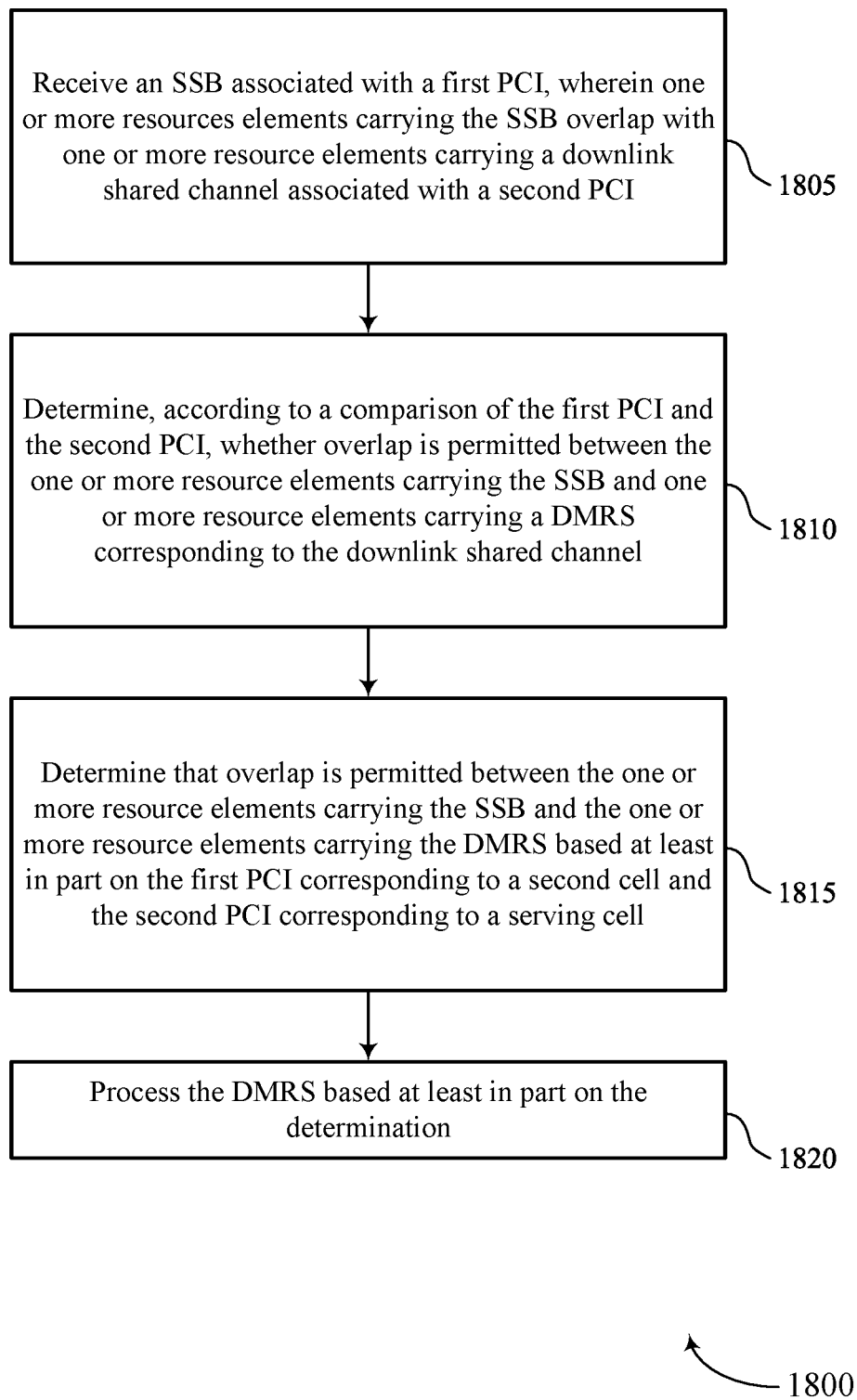

FIG. 18 shows a flowchart illustrating a method 1800 that supports resource element overlap between an SSB and DMRS in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving an SSB associated with a first PCI, where one or more resource elements carrying the SSB overlap with one or more resource elements carrying a downlink shared channel associated with a second PCI. The operations of 1805 may be performed in accordance with examples as disclosed herein. In some examples, aspects of the operations of 1805 may be performed by an SSB component 825 as described with reference to FIG. 8.

At 1810, the method may include determining, according to a comparison of the first PCI and the second PCI, whether overlap is permitted between the one or more resource elements carrying the SSB and one or more resource elements carrying a DMRS corresponding to the downlink shared channel. The operations of 1810 may be performed in accordance with examples as disclosed herein. In some examples, aspects of the operations of 1810 may be performed by a PCI component 830 as described with reference to FIG. 8.

At 1815, the method may include determining that overlap is permitted between the one or more resource elements carrying the SSB and the one or more resource elements carrying the DMRS based on the first PCI corresponding to a second cell and the second PCI corresponding to a serving cell. The operations of 1815 may be performed in accordance with examples as disclosed herein. In some examples, aspects of the operations of 1815 may be performed by a PCI component 830 as described with reference to FIG. 8.

At 1820, the method may include processing the DMRS based on the determination. The operations of 1820 may be performed in accordance with examples as disclosed herein. In some examples, aspects of the operations of 1820 may be performed by a DMRS component 835 as described with reference to FIG. 8.

Figure 19:
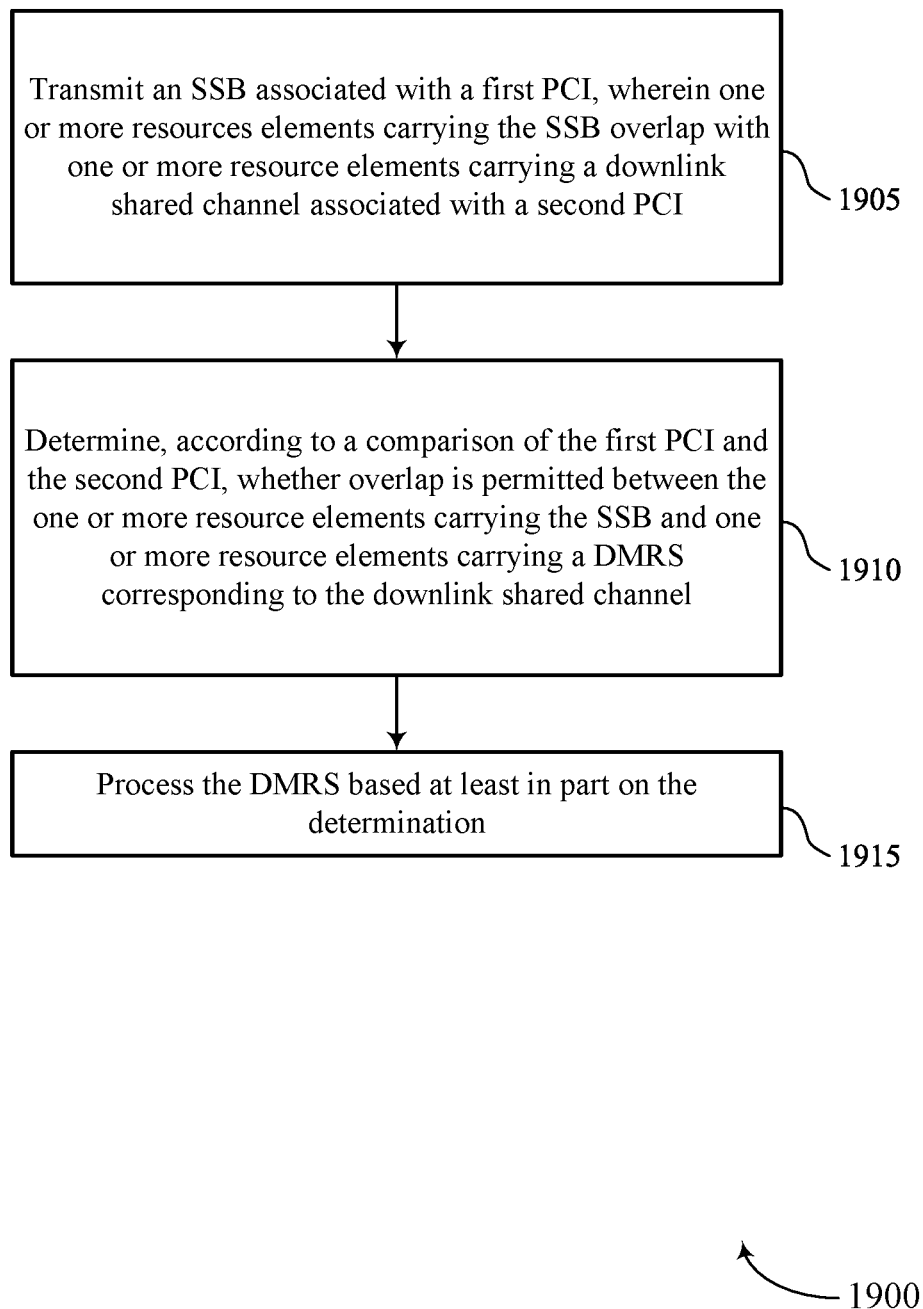

FIG. 19 shows a flowchart illustrating a method 1900 that supports resource element overlap between an SSB and DMRS in accordance with aspects of the present disclosure. The operations of the method 1900 may be implemented by a network entity implementing one or more aspects of a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting an SSB associated with a first PCI, where one or more resource elements carrying the SSB overlap with one or more resource elements carrying a downlink shared channel associated with a second PCI. The operations of 1905 may be performed in accordance with examples as disclosed herein. In some examples, aspects of the operations of 1905 may be performed by an SSB manager 1225 as described with reference to FIG. 12.

At 1910, the method may include determining, according to a comparison of the first PCI and the second PCI, whether overlap is permitted between the one or more resource elements carrying the SSB and one or more resource elements carrying a DMRS corresponding to the downlink shared channel. The operations of 1910 may be performed in accordance with examples as disclosed herein. In some examples, aspects of the operations of 1910 may be performed by a PCI manager 1230 as described with reference to FIG. 12.

At 1915, the method may include processing the DMRS based on the determination. The operations of 1915 may be performed in accordance with examples as disclosed herein. In some examples, aspects of the operations of 1915 may be performed by a DMRS manager 1235 as described with reference to FIG. 12.

The following provides an overview of aspects of the present disclosure:

Aspect 1: A method for wireless communications at a UE, comprising: receiving a synchronization signal block associated with a first physical layer cell identifier, wherein one or more resource elements carrying the synchronization signal block overlap with one or more resource elements carrying a downlink shared channel associated with a second physical layer cell identifier; determining, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and processing the demodulation reference signal based at least in part on the determination.

Aspect 2: The method of aspect 1, wherein determining whether overlap is permitted comprises: determining that no overlap is permitted between the one or more resource elements carrying the synchronization signal block and the one or more resource elements carrying the demodulation reference signal based at least in part on the first physical layer cell identifier and the second physical layer cell identifier being a same physical layer cell identifier.

Aspect 3: The method of aspect 1, wherein determining whether overlap is permitted comprises: determining that no overlap is permitted between the one or more resource elements carrying the synchronization signal block and the one or more resource elements carrying the demodulation reference signal based at least in part on the first physical layer cell identifier and the second physical layer cell identifier corresponding to a second cell.

Aspect 4: The method of aspect 1, wherein determining whether overlap is permitted comprises: determining that overlap is permitted between the one or more resource elements carrying the synchronization signal block and the one or more resource elements carrying the demodulation reference signal based at least in part on the first physical layer cell identifier corresponding to a serving cell and the second physical layer cell identifier corresponding to a second cell.

Aspect 5: The method of aspect 1, wherein determining whether overlap is permitted comprises: determining that overlap is permitted between the one or more resource elements carrying the synchronization signal block and the one or more resource elements carrying the demodulation reference signal based at least in part on the first physical layer cell identifier corresponding to a second cell and the second physical layer cell identifier corresponding to a serving cell.

Aspect 6: The method of any of aspects 1 through 5, further comprising: receiving a control message corresponding to a control resource set pool index value corresponding to the downlink shared channel, the control message comprising a scheduling downlink control information message.

Aspect 7: The method of aspect 6, further comprising: determining the downlink shared channel is associated with a serving cell based at least in part on the control resource set pool index value having a value of zero.

Aspect 8: The method of aspect 6, further comprising: determining the downlink shared channel is associated with a second cell based at least in part on the control resource set pool index value having a value of one.

Aspect 9: The method of any of aspects 6 through 8, wherein the control message is a semi-persistent scheduling control message corresponding to an activating downlink control information message received in a control resource set associated with the control resource set pool index value.

Aspect 10: The method of any of aspects 6 through 8, wherein the control message is a semi-persistent scheduling control message corresponding to semi-persistent scheduling configuration in a radio resource control message, the semi-persistent scheduling configuration indicating the control resource set pool index value.

Aspect 11: The method of any of aspects 1 through 10, further comprising: determining the downlink shared channel is associated with a serving cell based at least in part on a quasi-colocation relationship corresponding to the synchronization signal block being associated with the serving cell.

Aspect 12: The method of any of aspects 1 through 11, further comprising: determining the downlink shared channel is associated with a second cell based at least in part on a quasi-colocation relationship corresponding to the synchronization signal block being associated with the second cell.

Aspect 13: A method for wireless communications at a network entity, comprising: transmitting a synchronization signal block associated with a first physical layer cell identifier, wherein one or more resource elements carrying the synchronization signal block overlap with one or more resource elements carrying a downlink shared channel associated with a second physical layer cell identifier; determining, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and processing the demodulation reference signal based at least in part on the determination.

Aspect 14: The method of aspect 13, further comprising: determining there is no overlap between the one or more resource elements carrying the synchronization signal block and the one or more resource elements carrying the demodulation reference signal based at least in part on the first physical layer cell identifier and the second physical layer cell identifier being a same physical layer cell identifier.

Aspect 15: The method of aspect 13, further comprising: determining there is no overlap between the one or more resource elements carrying the synchronization signal block and the one or more resource elements carrying the demodulation reference signal based at least in part on the first physical layer cell identifier and the second physical layer cell identifier corresponding to a second cell.

Aspect 16: The method of aspect 13, further comprising: determining the one or more resource elements carrying the synchronization signal block and the one or more resource elements carrying the demodulation reference signal overlap based at least in part on the first physical layer cell identifier corresponding to a serving cell and the second physical layer cell identifier corresponding to a second cell.

Aspect 17: The method of aspect 13, further comprising: determining the one or more resource elements carrying the synchronization signal block and the one or more resource elements carrying the demodulation reference signal overlap based at least in part on the first physical layer cell identifier corresponding to a second cell and the second physical layer cell identifier corresponding to a serving cell.

Aspect 18: The method of any of aspects 13 through 17, further comprising: transmitting a control message indicating a control resource set pool index value corresponding to the downlink shared channel.

Aspect 19: The method of aspect 18, further comprising: determining the downlink shared channel is associated with a serving cell based at least in part on the control resource set pool index value having a value of zero.

Aspect 20: The method of any of aspects 18 through 19, further comprising: determining the downlink shared channel is associated with a second cell based at least in part on the control resource set pool index value having a value of one.

Aspect 21: The method of any of aspects 18 through 20, wherein the control message is a semi-persistent scheduling control message corresponding to an activating downlink control information message received in a control resource set associated with the control resource set pool index value.

Aspect 22: The method of any of aspects 18 through 20, wherein the control message is a semi-persistent scheduling control message corresponding to semi-persistent scheduling configuration in a radio resource control message, the semi-persistent scheduling configuration indicating the control resource set pool index value.

Aspect 23: The method of any of aspects 13 through 22, further comprising: determining the downlink shared channel is associated with a serving cell based at least in part on a quasi-colocation relationship corresponding to the synchronization signal block being associated with the serving cell.

Aspect 24: The method of any of aspects 13 through 22, further comprising: determining the downlink shared channel is associated with a second cell based at least in part on a quasi-colocation relationship corresponding to the synchronization signal block being associated with the second cell.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising a processor; memory coupled with the processor; and instructions stored in the memory and executable by the processor to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    a processor;
    memory coupled with the processor; and
    instructions stored in the memory and executable by the processor to cause the apparatus to:
        receive a synchronization signal block associated with a first physical layer cell identifier, wherein one or more resource elements carrying the synchronization signal block overlap with one or more resource elements carrying a downlink shared channel associated with a second physical layer cell identifier;
        determine, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and
        process the demodulation reference signal based at least in part on the determination.

2. The apparatus of claim 1, wherein the instructions to determine whether overlap is permitted are executable by the processor to cause the apparatus to:
    determine that no overlap is permitted between the one or more resource elements carrying the synchronization signal block and the one or more resource elements carrying the demodulation reference signal based at least in part on the first physical layer cell identifier and the second physical layer cell identifier being a same physical layer cell identifier.

3. The apparatus of claim 1, wherein the instructions to determine whether overlap is permitted are executable by the processor to cause the apparatus to:
    determine that no overlap is permitted between the one or more resource elements carrying the synchronization signal block and the one or more resource elements carrying the demodulation reference signal based at least in part on the first physical layer cell identifier and the second physical layer cell identifier corresponding to a second cell.

4. The apparatus of claim 1, wherein the instructions to determine whether overlap is permitted are executable by the processor to cause the apparatus to:
determine that overlap is permitted between the one or more resource elements carrying the synchronization signal block and the one or more resource elements carrying the demodulation reference signal based at least in part on the first physical layer cell identifier corresponding to a serving cell and the second physical layer cell identifier corresponding to a second cell.

5. The apparatus of claim 1, wherein the instructions to determine whether overlap is permitted are executable by the processor to cause the apparatus to:
determine that overlap is permitted between the one or more resource elements carrying the synchronization signal block and the one or more resource elements carrying the demodulation reference signal based at least in part on the first physical layer cell identifier corresponding to a second cell and the second physical layer cell identifier corresponding to a serving cell.

6. The apparatus of claim 1, wherein the instructions are further executable by the processor to cause the apparatus to:
receive a control message corresponding to a control resource set pool index value corresponding to the downlink shared channel, the control message comprising a scheduling downlink control information message.

7. The apparatus of claim 6, wherein the instructions are further executable by the processor to cause the apparatus to:
determine the downlink shared channel is associated with a serving cell based at least in part on the control resource set pool index value having a value of zero.

8. The apparatus of claim 6, wherein the instructions are further executable by the processor to cause the apparatus to:
determine the downlink shared channel is associated with a second cell based at least in part on the control resource set pool index value having a value of one.

9. The apparatus of claim 6, wherein the control message is a semi-persistent scheduling control message corresponding to an activating downlink control information message received in a control resource set associated with the control resource set pool index value.

10. The apparatus of claim 6, wherein the control message is a semi-persistent scheduling control message corresponding to semi-persistent scheduling configuration in a radio resource control message, the semi-persistent scheduling configuration indicating the control resource set pool index value.

11. The apparatus of claim 1, wherein the instructions are further executable by the processor to cause the apparatus to:
determine the downlink shared channel is associated with a serving cell based at least in part on a quasi-colocation relationship corresponding to the synchronization signal block being associated with the serving cell.

12. The apparatus of claim 1, wherein the instructions are further executable by the processor to cause the apparatus to:
determine the downlink shared channel is associated with a second cell based at least in part on a quasi-colocation relationship corresponding to the synchronization signal block being associated with the second cell.

13. An apparatus for wireless communications at a network entity, comprising:
a processor;
memory coupled with the processor; and
instructions stored in the memory and executable by the processor to cause the apparatus to:
transmit a synchronization signal block associated with a first physical layer cell identifier, wherein one or more resource elements carrying the synchronization signal block overlap with one or more resource elements carrying a downlink shared channel associated with a second physical layer cell identifier;
determine, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and
process the demodulation reference signal based at least in part on the determination.

14. The apparatus of claim 13, wherein the instructions are further executable by the processor to cause the apparatus to:
determine there is no overlap between the one or more resource elements carrying the synchronization signal block and the one or more resource elements carrying the demodulation reference signal based at least in part on the first physical layer cell identifier and the second physical layer cell identifier being a same physical layer cell identifier.

15. The apparatus of claim 13, wherein the instructions are further executable by the processor to cause the apparatus to:
determine there is no overlap between the one or more resource elements carrying the synchronization signal block and the one or more resource elements carrying the demodulation reference signal based at least in part on the first physical layer cell identifier and the second physical layer cell identifier corresponding to a second cell.

16. The apparatus of claim 13, wherein the instructions are further executable by the processor to cause the apparatus to:
determine the one or more resource elements carrying the synchronization signal block and the one or more resource elements carrying the demodulation reference signal overlap based at least in part on the first physical layer cell identifier corresponding to a serving cell and the second physical layer cell identifier corresponding to a second cell.

17. The apparatus of claim 13, wherein the instructions are further executable by the processor to cause the apparatus to:
determine the one or more resource elements carrying the synchronization signal block and the one or more resource elements carrying the demodulation reference signal overlap based at least in part on the first physical layer cell identifier corresponding to a second cell and the second physical layer cell identifier corresponding to a serving cell.

18. The apparatus of claim 13, wherein the instructions are further executable by the processor to cause the apparatus to:
transmit a control message indicating a control resource set pool index value corresponding to the downlink shared channel.

19. The apparatus of claim 18, wherein the instructions are further executable by the processor to cause the apparatus to:

determine the downlink shared channel is associated with a serving cell based at least in part on the control resource set pool index value having a value of zero.

20. The apparatus of claim 18, wherein the instructions are further executable by the processor to cause the apparatus to:
determine the downlink shared channel is associated with a second cell based at least in part on the control resource set pool index value having a value of one.

21. The apparatus of claim 18, wherein the control message is a semi-persistent scheduling control message corresponding to an activating downlink control information message received in a control resource set associated with the control resource set pool index value.

22. The apparatus of claim 18, wherein the control message is a semi-persistent scheduling control message corresponding to semi-persistent scheduling configuration in a radio resource control message, the semi-persistent scheduling configuration indicating the control resource set pool index value.

23. The apparatus of claim 13, wherein the instructions are further executable by the processor to cause the apparatus to:
determine the downlink shared channel is associated with a serving cell based at least in part on a quasi-colocation relationship corresponding to the synchronization signal block being associated with the serving cell.

24. The apparatus of claim 13, wherein the instructions are further executable by the processor to cause the apparatus to:
determine the downlink shared channel is associated with a second cell based at least in part on a quasi-colocation relationship corresponding to the synchronization signal block being associated with the second cell.

25. A method for wireless communications at a user equipment (UE), comprising:
receiving a synchronization signal block associated with a first physical layer cell identifier, wherein one or more resource elements carrying the synchronization signal block overlap with one or more resource elements carrying a downlink shared channel associated with a second physical layer cell identifier;
determining, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and
processing the demodulation reference signal based at least in part on the determination.

26. The method of claim 25, wherein determining whether overlap is permitted comprises:
determining that no overlap is permitted between the one or more resource elements carrying the synchronization signal block and the one or more resource elements carrying the demodulation reference signal based at least in part on the first physical layer cell identifier and the second physical layer cell identifier being a same physical layer cell identifier.

27. The method of claim 25, wherein determining whether overlap is permitted comprises:
determining that no overlap is permitted between the one or more resource elements carrying the synchronization signal block and the one or more resource elements carrying the demodulation reference signal based at least in part on the first physical layer cell identifier and the second physical layer cell identifier corresponding to a second cell.

28. The method of claim 25, wherein determining whether overlap is permitted comprises:
determining that overlap is permitted between the one or more resource elements carrying the synchronization signal block and the one or more resource elements carrying the demodulation reference signal based at least in part on the first physical layer cell identifier corresponding to a serving cell and the second physical layer cell identifier corresponding to a second cell.

29. The method of claim 25, wherein determining whether overlap is permitted comprises:
determining that overlap is permitted between the one or more resource elements carrying the synchronization signal block and the one or more resource elements carrying the demodulation reference signal based at least in part on the first physical layer cell identifier corresponding to a second cell and the second physical layer cell identifier corresponding to a serving cell.

30. A method for wireless communications at a network entity, comprising:
transmitting a synchronization signal block associated with a first physical layer cell identifier, wherein one or more resource elements carrying the synchronization signal block overlap with one or more resource elements carrying a downlink shared channel associated with a second physical layer cell identifier;
determining, according to a comparison of the first physical layer cell identifier and the second physical layer cell identifier, whether overlap is permitted between the one or more resource elements carrying the synchronization signal block and one or more resource elements carrying a demodulation reference signal corresponding to the downlink shared channel; and
processing the demodulation reference signal based at least in part on the determination.

\* \* \* \* \*